United States Patent
Park et al.

(10) Patent No.: US 12,174,513 B2
(45) Date of Patent: Dec. 24, 2024

(54) OPTICAL MODULATING DEVICE AND OPTICAL APPARATUS EMPLOYING THE SAME

(71) Applicant: SAMSUNG ELECTRONICS CO., LTD., Suwon-si (KR)

(72) Inventors: Junghyun Park, Seoul (KR); Sunil Kim, Osan-si (KR); Duhyun Lee, Yongin-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1067 days.

(21) Appl. No.: 17/101,200

(22) Filed: Nov. 23, 2020

(65) Prior Publication Data

US 2021/0405500 A1 Dec. 30, 2021

(30) Foreign Application Priority Data

Jun. 30, 2020 (KR) ........................ 10-2020-0080500

(51) Int. Cl.
*G02F 1/29* (2006.01)
*G01S 7/481* (2006.01)
(Continued)

(52) U.S. Cl.
CPC .............. *G02F 1/292* (2013.01); *G01S 7/481* (2013.01); *G01S 7/4814* (2013.01);
(Continued)

(58) Field of Classification Search
CPC ........ G02F 1/292; G02F 1/29; G02F 2202/20; G02F 2202/30; G02F 2203/10;
(Continued)

(56) References Cited

U.S. PATENT DOCUMENTS

| | | | |
|---|---|---|---|
| 5,222,071 | A | 6/1993 | Pezeshki et al. |
| 10,824,043 | B2 | 11/2020 | Park et al. |

(Continued)

FOREIGN PATENT DOCUMENTS

| | | |
|---|---|---|
| KR | 1020180002212 A | 1/2018 |
| KR | 1020190011121 A | 2/2019 |

(Continued)

OTHER PUBLICATIONS

Wang, Y., et al., "2D broadband beamsteering with large-scale MEMS optical phased array", Optica, vol. 6, No. 5, May 2019, pp. 557-562.

*Primary Examiner* — Balram T Parbadia
(74) *Attorney, Agent, or Firm* — Sughrue Mion, PLLC

(57) ABSTRACT

Provided is an optical modulating device including an incidence optical system, an optical modulating assembly including a plurality of nano-antennas that form a meta-grating based on a driving signal, the optical modulating assembly being configured to change a traveling direction of incidence light incident at an incidence angle from the incidence optical system based on an effective displacement of the meta-grating according to the driving signal, and an emission optical system configured to emit light steered by the optical modulating assembly, wherein the emission optical system is further configured to emit first-order diffraction light of the incidence light based on the meta-grating.

18 Claims, 18 Drawing Sheets

(51) Int. Cl.
*G01S 17/88* (2006.01)
*G01S 17/89* (2020.01)
*G02B 5/00* (2006.01)
*G02B 26/02* (2006.01)
*G02B 26/06* (2006.01)
*B82Y 20/00* (2011.01)

(52) U.S. Cl.
CPC ............ *G01S 7/4817* (2013.01); *G01S 17/88* (2013.01); *G01S 17/89* (2013.01); *G02B 5/008* (2013.01); *G02B 26/02* (2013.01); *G02B 26/06* (2013.01); *G02F 1/29* (2013.01); *B82Y 20/00* (2013.01); *G02F 2202/20* (2013.01); *G02F 2202/30* (2013.01); *G02F 2203/10* (2013.01); *G02F 2203/24* (2013.01)

(58) Field of Classification Search
CPC .... G02F 2203/24; G02F 1/0102; G01S 7/481; G01S 7/4814; G01S 7/4817; G01S 17/88; G01S 17/89; G02B 5/008; G02B 26/02; G02B 26/06; B82Y 20/00
See application file for complete search history.

(56) References Cited

U.S. PATENT DOCUMENTS

| | | | |
|---|---|---|---|
| 2002/0191913 A1* | 12/2002 | Hocker | G02B 6/3516 385/24 |
| 2010/0253995 A1 | 10/2010 | Reichelt | |
| 2014/0224989 A1* | 8/2014 | Long | G02F 1/0136 977/932 |
| 2016/0170237 A1* | 6/2016 | Han | G02B 5/008 359/241 |
| 2016/0223723 A1* | 8/2016 | Han | G02F 1/292 |
| 2018/0024412 A1* | 1/2018 | Kim | G02F 1/292 359/315 |
| 2018/0136537 A1* | 5/2018 | Kim | G01S 7/4817 |
| 2018/0196137 A1* | 7/2018 | Lee | G01S 7/481 |
| 2019/0025509 A1 | 1/2019 | Kim et al. | |
| 2019/0075275 A1* | 3/2019 | Lee | H04N 9/315 |
| 2019/0204492 A1 | 7/2019 | Park et al. | |
| 2019/0265557 A1* | 8/2019 | Yang | G02F 1/29 |
| 2019/0294019 A1* | 9/2019 | Park | G01S 17/90 |
| 2021/0157179 A1* | 5/2021 | Cala' Lesina | G01S 7/481 |
| 2022/0252945 A1* | 8/2022 | Xu | G02F 1/134309 |

FOREIGN PATENT DOCUMENTS

| | | |
|---|---|---|
| KR | 1020190083230 A | 7/2019 |
| KR | 1020190136434 A | 12/2019 |

* cited by examiner $x_L = 0$ $x_L = \frac{\Lambda}{3}$ $x_L = \frac{2\Lambda}{3}$ FIG. 17B
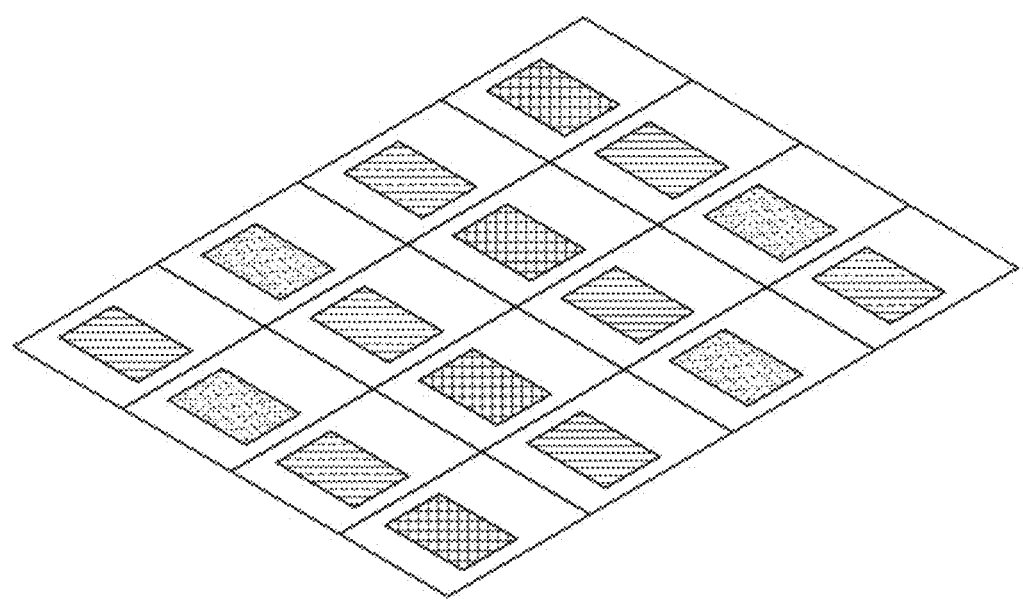
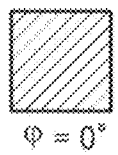   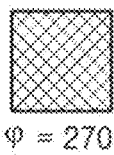
φ = 0°   φ = 90°   φ = 180°   φ = 270°

OPTICAL MODULATING DEVICE AND OPTICAL APPARATUS EMPLOYING THE SAME

CROSS-REFERENCE TO RELATED APPLICATION

This application claims priority to Korean Patent Application No. 10-2020-0080500, filed on Jun. 30, 2020 in the Korean Intellectual Property Office, the disclosure of which is incorporated herein in its entirety by reference.

BACKGROUND

1. Field

Example embodiments of the present disclosure relate to an optical modulating device and an optical apparatus employing the same.

2. Description of Related Art

Optical modulating devices that change the transmission/reflection/scattering characteristics of light, phase, amplitude, polarization, intensity, and path are used in various optical apparatuses. To control the properties of light within an optical system in a desired manner, optical modulating devices of various structures have been proposed. For example, a liquid crystal having optical anisotropy or a microelectromechanical system (MEMS) structure using micro-mechanical movement of light blocking/reflecting elements is used in general optical modulating devices. These optical modulating devices have a limit in response time due to the characteristics of a driving method. In the case of the MEMS structure, it is necessary to correct the nonlinearity of the voltage-displacement characteristic, and an optimized driving voltage profile to correct the influence of vibration of a motion system must be secured.

Recently, there has been an attempt to utilize a meta structure using a surface plasmon resonance phenomenon with respect to incidence light in an optical modulating device.

SUMMARY

One or more example embodiments provide an optical modulating device configured to reduce a side lobe.

One or more example embodiments provide an optical modulating device configured to operate in high-speed and having a small dispersion of response.

Additional aspects will be set forth in part in the description which follows and, in part, will be apparent from the description, or may be learned by practice of example embodiments.

According to an aspect of an example embodiment, there is provided an optical modulating device including an incidence optical system, an optical modulating assembly including a plurality of nano-antennas that form a meta-grating based on a driving signal, the optical modulating assembly being configured to change a traveling direction of incidence light incident at an incidence angle from the incidence optical system based on an effective displacement of the meta-grating according to the driving signal, and an emission optical system configured to emit light steered by the optical modulating assembly, wherein the emission optical system is further configured to emit first-order diffraction light of the incidence light based on the meta-grating.

A central axis of the emission optical system may be parallel to an optical axis of the first-order diffraction light when a displacement of the meta-grating is 0.

A central axis of the emission optical system may coincide with an optical axis of the first-order diffraction light when a displacement of the meta-grating is 0.

The incidence angle of the incidence light with respect to a surface normal vector of the optical modulating assembly is $\theta_{in}$, and an angle of a central axis of the emission optical system is $\theta_{out}$, a wavelength of the incidence light is $\lambda_0$, and a period of the meta-grating is $\Lambda$, may satisfy $$\sin\theta_{out} = \sin\theta_{in} \pm \frac{\lambda_0}{\Lambda}.$$

The optical modulating assembly may further include a plurality of pixels, and the plurality of pixels respectively may include the plurality of nano-antennas.

Each of the plurality of pixels may include one or more antenna groups, the one or more antenna groups may include the plurality of nano-antennas, and a period of the meta-grating may be equal to a period of the one or more antenna groups.

Each of the plurality of pixels may include two or more antenna groups, and the driving signal of a same pattern may be applied to the two or more antenna groups included in a pixel among the plurality of pixels.

A number of the plurality of pixels is L, a number of antenna groups in each of the plurality of pixels is M, and a number of nano-antennas in each of the one or more antenna groups is N, an n-th nano-antenna of an m-th antenna group of an l-th pixel MP is $A_{lmn}$, and an optical intensity of $A_{lmn}$ is $R_{lmn}$, may satisfy $$R_{lmn}(d) = \begin{cases} 1, & (n-d) \bmod N < C \\ 0, & \text{otherwise.} \end{cases},$$

where d=1, 2, ..., N, and C is any one of 1 to N−1.

The plurality of pixels may be provided one-dimensionally.

The plurality of pixels may be provided two-dimensionally.

The optical modulating assembly may further include a reflector, and an active layer provided between the reflector and the plurality of nano-antennas, wherein optical properties of the active layer changes based on the driving signal.

The plurality of nano-antennas may include metal antennas.

The plurality of nano-antennas may include dielectric antennas.

Each of the plurality of nano-antennas may have a Fabry-Perot resonance structure that includes a first reflection structure, a cavity layer provided on the first reflection structure, and a second reflection structure provided on the cavity layer.

According to an aspect of another example embodiment, there is provided an optical modulating device including an incidence optical system, an optical modulating assembly including a plurality of pixels each including a plurality of nano-antennas, the optical modulating assembly being configured to change a traveling direction of incidence light incident at a fixed incidence angle from the incidence optical system by changing an optical intensity of the plurality of nano-antennas based on a periodic and discrete driving signal that is applied to the plurality of nano-antennas, an emission optical system configured to emit light steered by the optical modulating assembly, wherein, an incidence angle of the incidence light with respect to a surface normal vector of the optical modulating assembly is $\theta_{in}$, an angle of a central axis of the emission optical system is $\theta_{out}$, a wavelength of the incidence light is $\lambda_0$, and a period of a meta-grating is $\Lambda$, satisfies $$\sin\theta_{out} = \sin\theta_{in} \pm \frac{\lambda_0}{\Lambda}.$$

Each of the plurality of pixels may include one or more antenna groups, the one or more antenna groups respectively may include the plurality of nano-antennas, and a period of the driving signal may be equal to a period of the one or more antenna groups.

The driving signal of a same pattern may be applied to two or more antenna groups in a pixel among the plurality of pixels.

A number of the plurality of pixels is L, a number of antenna groups in each of the plurality of pixels is M, and a number of nano-antennas in each of the one or more antenna groups is N, an n-th nano-antenna of an m-th antenna group of an l-th pixel MP is $A_{lmn}$, and an optical intensity of $A_{lmn}$ is $R_{lmn}$, may satisfy $$R_{lmn}(d) = \begin{cases} 1, & (n-d) \bmod N < C \\ 0, & \text{otherwise.} \end{cases}$$

where d=1, 2, ..., N, and C is any one of 1 to N−1.

According to an aspect of another example embodiment, there is provided an optical apparatus including an optical modulating device including an incidence optical system, an optical modulating assembly including a plurality of nano-antennas that form a meta-grating based on a driving signal, the optical modulating assembly being configured to change a traveling direction of incidence light incident at an incidence angle from the incidence optical system based on an effective displacement of the meta-grating according to the driving signal, and an emission optical system configured to emit light steered by the optical modulating assembly, wherein the emission optical system is further configured to emit first-order diffraction light of the incidence light based on the meta-grating.

The optical apparatus may further include at least one of a light detection and ranging (LiDAR) device, a three-dimensional (3D) image obtaining device, a holographic display device, and a structured light generating device.

BRIEF DESCRIPTION OF THE DRAWINGS

The above and/or other aspects, features, and advantages of certain example embodiments will be more apparent from the following description taken in conjunction with the accompanying drawings, in which:

FIGS. 13 and 14 are diagrams showing an optical modulating element according to example embodiments, wherein FIG. 13 shows an example where there is no relative phase difference between a plurality of pixels, and FIG. 14 shows an example where a beam is steered by a relative phase difference between the plurality of pixels;

FIGS. 17A and 17B are diagrams of an example of a structure in which a plurality of pixels are two-dimensionally arranged in a Cartesian coordinate;

FIGS. 22 and 23 are conceptual diagrams illustrating an example where a light detection and ranging (LiDAR) device including an optical modulating device according to an example embodiment is applied to a vehicle, wherein FIG. 22 is a side view, and FIG. 23 is a plan view.

DETAILED DESCRIPTION

Figure 1:
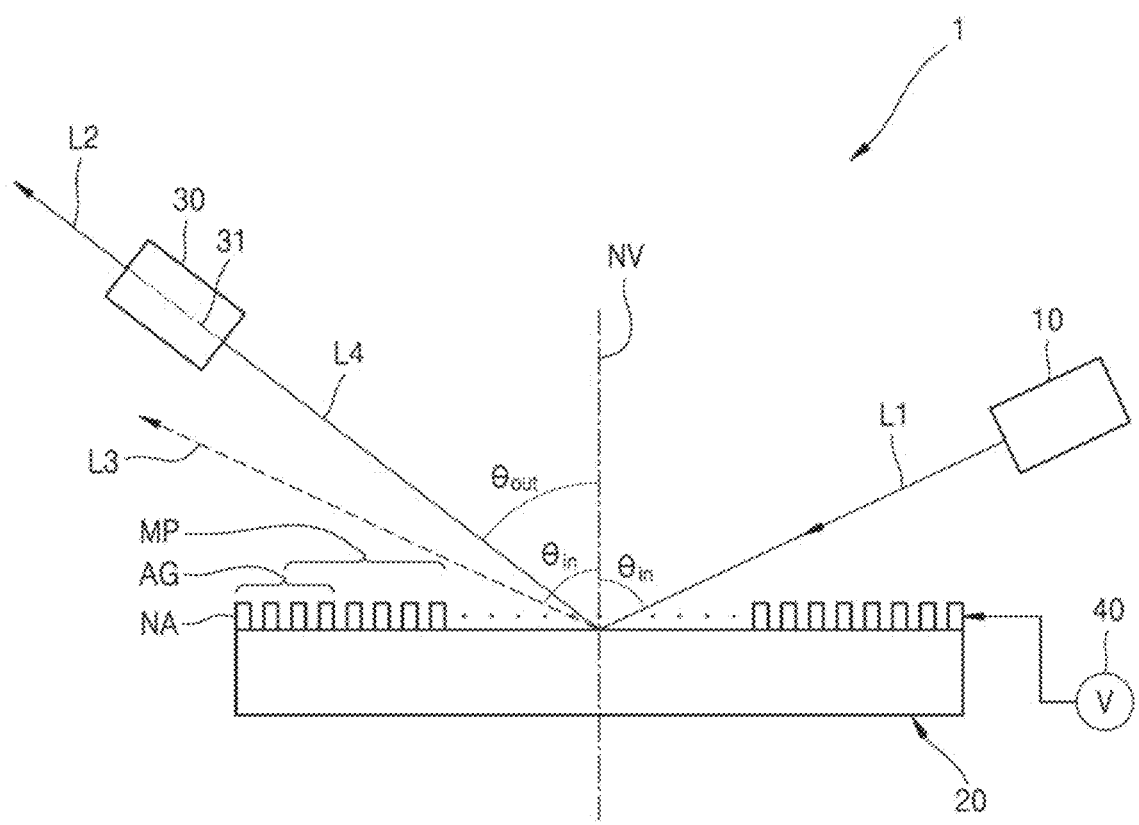
FIG. 1 is a diagram showing an optical modulating device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" may include any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, an optical modulating device and an optical apparatus including the same according to example embodiments will be described in detail with reference to the accompanying drawings. In the drawings, the size of each element may be exaggerated for clarity and convenience of description.

FIG. 1 is a diagram showing an optical modulating device 1 according to an example embodiment. FIGS. 2A to 2D are diagrams showing an example of the displacement of a meta-grating MG when the optical intensity of a plurality of nano-antennas NA changes periodically and discretely.

Referring to FIGS. 1 and 2A to 2D, the optical modulating device 1 of an example embodiment may include an incidence optical system 10, an optical modulating element 20 that may include the plurality of nano-antennas NA that form the meta-grating MG or an effective grating by a driving signal and changes a traveling direction of incidence light L1 incident at a fixed incidence angle $\theta_{in}$ from the incidence optical system 10 by using an effective displacement of the meta-grating MG according to the driving signal applied to the plurality of nano-antennas NA. The optical modulating device 1 may also include an emission optical system 30 through which light L2 steered by the optical modulating element 20 is emitted. The emission optical system 30 may emit first-order diffraction light of the incidence light L1 by the meta-grating MG. The optical modulating device 1 may further include a driving signal applier 40 that applies the driving signal to the plurality of nano-antennas NA.

The incidence optical system 10 may include a light source. The incidence optical system 10 may include one or more optical elements, for example, a lens, which shapes light radiated from the light source into the incidence light L1 of a desired shape.

At least one of the length, width, thickness, and interval of the plurality of nano-antennas NA may be less than the wavelength of the incidence light L1. The optical intensity of each nano-antenna NA, for example, the intensity of reflection/transmission/scattering, may be individually adjusted by applying the driving signal, for example, a voltage, to each nano-antenna NA. As a result, an effect similar to that of the meta-grating MG causing displacement may be obtained. A periodic displacement of the meta-grating MG may be induced by applying a periodic and discrete driving signal to the plurality of nano-antennas NA, and accordingly, a high-order diffraction component of light incident on the plurality of nano-antennas NA may have a geometric phase proportional to the displacement of the meta-grating MG.

As an example, the optical modulating element 20 may include a plurality of pixels MP. Each of the plurality of pixels MP may include the plurality of nano-antennas NA. As the periodic and discrete driving signal is applied to the plurality of nano-antennas NA of the plurality of pixels MP, the optical intensity of the plurality of nano-antennas NA changes, and the traveling direction of the incidence light L1 from the incidence optical system 10 may change. A pattern of the driving signal may be periodic with respect to each pixel MP. Each of the plurality of pixels MP may include one or more antenna groups AG. Each antenna group AG may include the plurality of nano-antennas NA. In this case, the driving signal may be periodic with respect to each antenna group AG. For example, the period of the pattern of the driving signal may be the same as the period of the antenna group AG. When each pixel MP includes two or more antenna groups AG, driving signals of the same pattern may be applied to the two or more antenna groups AG.

The number of nano-antennas NA of each pixel MP may be appropriately determined according to the range and step of the geometric phase to be expressed. As the number of antenna groups AG of each pixel MP increases, the accuracy of beam steering may be improved. Therefore, it is ideal that the number of antenna groups AG of each pixel MP is infinite, but the number of antenna groups AG may be appropriately determined according to the required precision of beam steering. For example, each pixel MP may include 2 to 3 antenna groups AG.

The plurality of pixels MP may have a one-dimensional (1D) arrangement structure. 1D beam steering is possible by appropriately arranging geometric phases of the plurality of pixels MP. The plurality of pixels MP may have a two-dimensional (2D) arrangement structure. 2D beam steering is possible by appropriately arranging the geometric phases of the plurality of pixels MP that are two-dimensionally arranged. The light may be a plane wave, a spherical wave, a Gaussian beam, etc.

Reflection light may include a main lobe and a side lobe. When 0th-order diffraction light is steered, an unwanted side lobe may occur, resulting in a decrease in a signal-to-noise ratio (SNR). In the optical modulating device 1 of the example embodiment, first-order diffraction light of the light reflected from the optical modulating element 20 is emitted. Specular reflection light L3 is 0th-order diffraction light of the incidence light L1 when the displacement of the geometric phase of the plurality of pixels MP is 0. When the first-order diffraction light is steered, a ratio of the side lobe is lower than that of the 0th-order diffraction light. Thus, an improved SNR may be obtained. To this end, the optical modulating device 1 of the example embodiment may include the emission optical system 30 that emits the first-order diffraction light of the incidence light L1 by the meta-grating MG. The emission optical system 30 may include one or more optical elements, for example, a lens, for shaping and emitting the first-order diffraction light into a desired shape. As an example, a central axis 31 of the emission optical system 30 may be parallel to an optical axis of the first-order diffraction light L4 when the displacement of the meta-grating MG is 0. As an example, as shown in FIG. 1, the central axis 31 of the emission optical system 30 may coincide with the optical axis of the first-order diffraction light L4 when the displacement of the meta-grating MG is 0. For example, in case where an incidence angle of the incidence light L1 with respect to a surface normal vector NV of the optical modulating element 20 and an angle of the central axis 31 of the emission optical system 30 are respectively denoted by $\theta_{in}$ and $\theta_{out}$, a wavelength of the incidence light L1 is denoted by $\lambda_0$, and a period of the meta-grating MG is denoted by $\Lambda$, the below is satisfied.

$$\sin\theta_{out} = \sin\theta_{in} \pm \frac{\lambda_0}{\Lambda}$$

The driving signal may be patterned, and the period of the meta-grating MG may be the same as the period of the driving signal pattern applied to the plurality of nano-antennas NA.

Hereinafter, the geometric phase of the meta-grating MG by the periodic and discrete driving signal applied to the plurality of nano-antennas NA will be described.

The number of pixels MP is denoted by L (L is a positive integer), the number of antenna groups AG in each pixel MP is denoted by M (M is a positive integer), and the number of nano-antennas NA in each antenna group AG is denoted by N (N is a positive integer). An n-th (n=1, 2, . . . , N) nano-antenna NA of an m-th (m=1, 2, . . . , M) antenna group AG of an l-th (l=1, 2, . . . , L) pixel MP is denoted by $A_{lmn}$ and an intensity of transmission/reflection/scattering of $A_{lmn}$ is denoted by $R_{lmn}$. At this time, $R_{lmn}$ may be determined as in Equation (1) below.

$$R_{lmn}(d) = \begin{cases} 1, & (n-d)\bmod N < C \\ 0, & \text{otherwise} \end{cases} \quad \text{Equation (1)}$$

Here, d=1, 2, . . . , N, mod is a modulus operator, and (n−d) mod N is the remainder of (n−d) divided by N.

In each pixel MP, two different antenna groups AG have the same intensity distribution of reflection/transmission/scattering, and satisfy Equation (2) below.

$$R_{lm_2n} R_{lm_2n} \text{ (for all } m_1 \text{ and } m_2\text{).} \quad \text{Equation (2)}$$

In this case, an effective displacement $x_l$ of the l-th pixel MP is as shown in Equation (3) below. A phase $\varphi_l$ of the l-th pixel MP is as shown in Equation (4) below.

$$x_l(d) = \left(\frac{d-1}{N}\right)\Lambda \quad \text{Equation (3)}$$

$$\varphi_l(d) = \frac{2\pi x_l(d)}{\Lambda} = \frac{2\pi}{N}(d-1) \quad \text{Equation (4)}$$

Therefore, the phase of each pixel MP may be controlled by adjusting d, and the smallest phase that may be expressed in each pixel MP is 0 degrees when d=1, and the largest phase is as shown in Equation (5) below.

$$\varphi_{l,max} = \varphi_l(d)|_{d=N} = \frac{2\pi}{N}(N-1) \quad \text{Equation (5)}$$

Referring back to FIGS. 2A to 2D, the effective displacement of the meta-grating MG due to the periodic and discrete driving signal will be described. In FIGS. 2A to 2D, L=1, M=2, and N=4. The nano-antenna NA is schematically shown. The nano-antenna NA of a dark pattern represents a case in which $R_{lmn}$ is 1 due to its strong optical intensity, and the nano-antenna NA of a bright pattern represents a case in which $R_{lmn}$ is 0 due to its weak optical intensity.

Figure 2A:
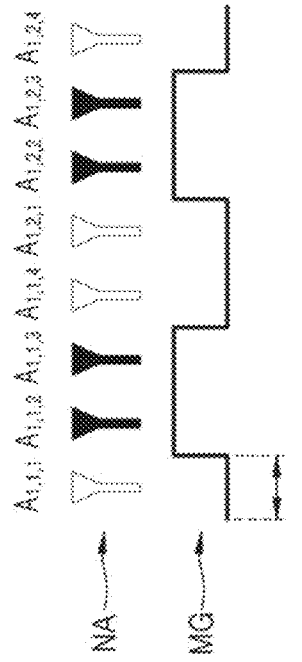
FIGS. 2A, 2B, 2C, and 2D are diagrams showing an example of the displacement of a meta-grating when the optical intensity of a plurality of nano-antennas changes periodically and discretely.

FIG. 2A shows a case where d=1. When $R_{1,1,1}(1)$ is obtained from Equation (1), n−d=1−1=0, and 0 mod 4=0<4/2=2. Therefore, $R_{1,1,1}(1)$=1. When $R_{1,1,2}(1)$, $R_{1,1,3}(1)$, and $R_{1,1,4}(1)$ are obtained, $R_{1,1,2}(1)$=1, $R_{1,1,3}(1)$=0, and $R_{1,1,4}(1)$=0, respectively. Because the optical intensity distribution of the same antenna group AG is the same, $R_{1,2,1}(1)$=1, $R_{1,2,2}(1)$=1, $R_{1,2,3}(1)$=0, and $R_{1,2,4}(1)$=0. Summarizing these results, in the case where d=1, [$R_{1,1,1}$, $R_{1,1,2}$, $R_{1,1,3}$, $R_{1,1,4}$, $R_{1,2,1}$, $R_{1,2,2}$, $R_{1,2,3}$, $R_{1,2,4}$]=[1,1,0,0,1,1,0,0]. When the optical intensity of the nano-antenna NA is periodically repeated to be strong and weak, a grating-like effect may exist, and the nano-antennas NA may operate as the meta-grating MG or the effective grating. The period $\Lambda$ of the meta-grating MG may be the same as the period of the antenna group AG. As shown in FIG. 2A, the displacement of the period $\Lambda$ is defined as 0 based on the fact that the left two nano-antennas NA have strong optical intensity and the right two nano-antennas NA have weak optical intensity among four nano-antennas NA inside the meta-grating MG.

Figure 2B:
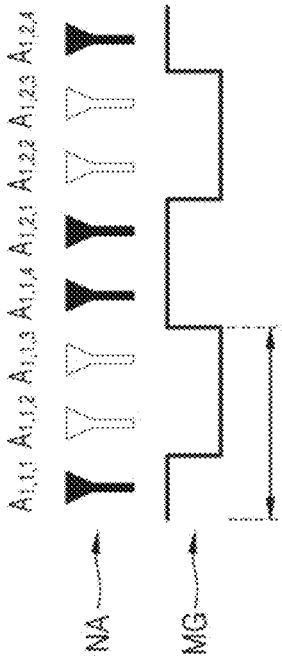
Figure 2C:
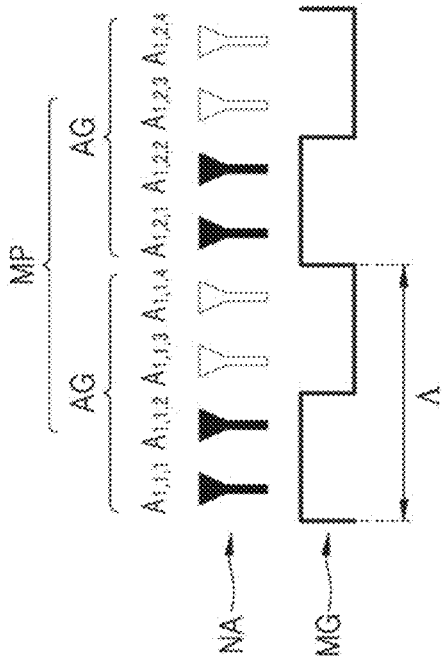
Figure 2D:
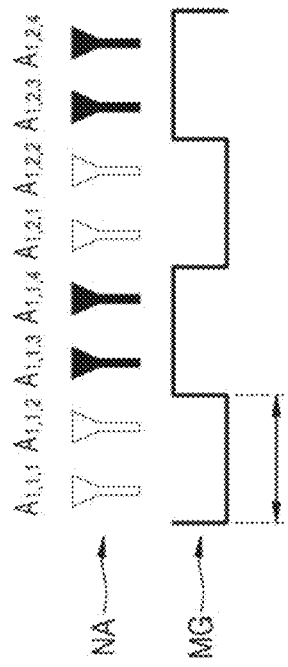

FIG. 2B shows a case where d=2. When Equation (1) is used, [$R_{1,1,1}$, $R_{1,1,2}$, $R_{1,1,3}$, $R_{1,1,4}$, $R_{1,2,1}$, $R_{1,2,2}$, $R_{1,2,3}$, $R_{1,2,4}$]=[0,1,1,0,0,1,1,0]. Thus, the effect in which the meta-grating MG is displaced by $\Lambda/4$ is realized. FIG. 2C shows a case where d=3. When Equation (1) is used, [$R_{1,1,1}$, $R_{1,1,2}$, $R_{1,1,3}$, $R_{1,1,4}$, $R_{1,2,1}$, $R_{1,2,2}$, $R_{1,2,3}$, $R_{1,2,4}$]=[0,0,1,1,0,0,1,1], which exhibits the effect in which the meta-grating MG is shifted by $\Lambda/2$. FIG. 2D shows a case where d=4. When Equation (1) is used, [$R_{1,1,1}$, $R_{1,1,2}$, $R_{1,1,3}$, $R_{1,1,4}$, $R_{1,2,1}$, $R_{1,2,2}$, $R_{1,2,3}$, $R_{1,2,4}$]=[1,0,0,1,1,0,0,1], which exhibits the effect in which the meta-grating MG is shifted by $3\Lambda/4$. Therefore, the phase displacement of the meta-grating MG defined by Equation (3) may be realized by applying the driving signal that discretely and periodically changes the optical intensity of the plurality of nano-antennas NA to the plurality of nano-antennas NA.

To increase the expressible range of phase and express phases of several steps, it is necessary to increase the number of nano-antennas NA in each pixel MP, for example, to increase N. To increase N, a greater number of nano-antennas NA must be disposed in each pixel MP, and a greater number of wiring structures for applying the driving signal must be disposed, which increase the complexity of the system. Therefore, an appropriate N value according to the required phase range and number of phase steps may be selected.

Next, the phase change of diffraction light due to the displacement of the meta-grating MG will be described. A plane where the nano-antennae NA exists is defined as a plane where Z=0. It is assumed that a light wave is incident on the nano-antenna NA at the incidence angle $\theta_i$ on a XZ plane. It is assumed that there is no change along the y-axis inside the pixel MP. At this time, a wavefunction $U_i(x,y,z)$ of the light wave is satisfies the below.

$$U_i(x,y,z) = Ae^{ik(x\sin\theta_i - z\cos\theta_i)}$$

Here, k denotes a wavenumber, k=$2\pi/\lambda_0$, $\lambda_0$ denotes a wavelength of the light wave in free space, and A denotes an amplitude of an incidence wave. On a plane where Z=0, the wavefunction $U_i(x,y,z=0)$ satisfies the below.

$$U_i(x,y,z=0) = Ae^{ikx\sin\theta_i}$$

The effective grating has the period $\Lambda$. The wavefunction by the effective grating is expressed by a Fourier series is shown below.

$$g(x) = \sum_{p=-\infty}^{\infty} c_p e^{\frac{i2\pi p x}{\Lambda}}$$

Here, $C_p$ denotes a p-th order Fourier coefficient and is given as shown in Equation (6).

$$c_p = \frac{1}{\Lambda} \int_{-\frac{\Lambda}{2}}^{\frac{\Lambda}{2}} g(\xi) e^{-\frac{i2\pi p \xi}{\Lambda}} d\xi \qquad \text{Equation (6)}$$

In addition, $\eta_p$ which is a p-th order diffraction efficiency is $|C_p|^2$. A value in a grating plane of the light wave transmitted or reflected by the meta-grating MG satisfies the below.

$$U_o(x, y, z=0) = U_i(x, y, z=0) \times g(x) = \sum_{p=-\infty}^{\infty} c_p A e^{iks in\theta_p x}.$$

Here, $\theta_p$ denotes a diffraction angle and satisfies the below.

$$\sin\theta_p = \sin\theta_i - \frac{2\pi}{\Lambda} p$$

A coefficient $U_{o,p}$ of the p-th order diffraction component satisfies Equation (7) below.

$$U_{o,p} = c_p A e^{ikx\left(\sin\theta_i + \frac{2\pi}{\Lambda} p\right)} \qquad \text{Equation (7)}$$

A p-th order diffraction component $U'_{o,p}$ is obtained when the meta-grating MG has a displacement by $x_l$. A p-th order Fourier coefficient $C'_p$ when the meta-grating MG has the displacement satisfies Equation (8) below.

$$c'_p = \frac{1}{\Lambda} \int_{-\frac{\Lambda}{2}}^{\frac{\Lambda}{2}} g(\xi + x_l) e^{-\frac{i2\pi p \xi}{\Lambda}} d\xi = \qquad \text{Equation (8)}$$

$$\frac{1}{\Lambda} \int_{-\frac{\Lambda}{2}-x_l}^{\frac{\Lambda}{2}-x_l} g(\xi') e^{-\frac{i2\pi p(\xi'-x_l)}{\Lambda}} d\xi' =$$

$$\frac{e^{\frac{i2\pi p x_l}{\Lambda}}}{\Lambda} \int_{-\frac{\Lambda}{2}-x_l}^{\frac{\Lambda}{2}-x_l} g(\xi') e^{-\frac{i2\pi p \xi'}{\Lambda}} d\xi'$$

Here, a variable substitution of $\xi'=\xi+x_l$ is applied. An integral section of the above equation is divided into two as shown below.

$$\int_{-\frac{\Lambda}{2}-x_l}^{\frac{\Lambda}{2}-x_l} g(\xi') e^{-\frac{i2\pi p \xi'}{\Lambda}} d\xi' =$$

$$\int_{-\frac{\Lambda}{2}-x_l}^{\frac{\Lambda}{2}} g(\xi') e^{-\frac{i2\pi p \xi'}{\Lambda}} d\xi' + \int_{\frac{\Lambda}{2}}^{\frac{\Lambda}{2}-x_l} g(\xi') e^{-\frac{i2\pi p \xi'}{\Lambda}} d\xi'$$

When a variable substitution of $\xi''=\xi'-\Lambda$ is again applied to the second term of the right-hand side of the above equation, Equation (9) shown below is satisfied.

$$\int_{-\frac{\Lambda}{2}-x_l}^{\frac{\Lambda}{2}-x_l} g(\xi') e^{-\frac{i2\pi p \xi'}{\Lambda}} d\xi' = \int_{-\frac{\Lambda}{2}-x_l}^{\frac{\Lambda}{2}} g(\xi') e^{-\frac{i2\pi p \xi'}{\Lambda}} d\xi' + \qquad \text{Equation (9)}$$

$$\int_{\frac{\Lambda}{2}-\Lambda}^{\frac{\Lambda}{2}-x_l-\Lambda} g(\xi''+\Lambda) e^{-\frac{i2\pi p(\xi''+\Lambda)}{\Lambda}} d\xi''$$

Because a grating function $g(x)$ is a periodic function with the period $\Lambda$, the grating function satisfies $g(\xi''+\Lambda)=g(\xi'')$ and by the Euler formula, $$e^{-\frac{i2\pi p \Lambda}{\Lambda}} = e^{-i2\pi p} = 1.$$

Therefore, Equation (9) satisfies Equation (1) shown below.

$$\text{Equation (10)}$$

$$\int_{-\frac{\Lambda}{2}-x_l}^{\frac{\Lambda}{2}-x_l} g(\xi') e^{-\frac{i2\pi p \xi'}{\Lambda}} d\xi' =$$

$$\int_{-\frac{\Lambda}{2}-x_l}^{\frac{\Lambda}{2}} g(\xi') e^{-\frac{i2\pi p \xi'}{\Lambda}} d\xi' + \int_{\frac{\Lambda}{2}-\Lambda}^{\frac{\Lambda}{2}-x_l-\Lambda} g(\xi'') e^{-\frac{i2\pi p \xi'}{\Lambda}} d\xi'' =$$

$$\int_{-\frac{\Lambda}{2}-x_l}^{\frac{\Lambda}{2}} g(\xi') e^{-\frac{i2\pi p \xi'}{\Lambda}} d\xi' + \int_{-\frac{\Lambda}{2}}^{-\frac{\Lambda}{2}-x_l} g(\xi'') e^{-\frac{i2\pi p \xi'}{\Lambda}} d\xi'' =$$

$$\int_{-\frac{\Lambda}{2}}^{-\frac{\Lambda}{2}-x_l} g(\xi'') e^{-\frac{i2\pi p \xi'}{\Lambda}} d\xi'' + \int_{-\frac{\Lambda}{2}-x_l}^{\frac{\Lambda}{2}} g(\xi') e^{-\frac{i2\pi p \xi'}{\Lambda}} d\xi' =$$

$$\int_{-\frac{\Lambda}{2}}^{-\frac{\Lambda}{2}-x_l} g(\xi') e^{-\frac{i2\pi p \xi'}{\Lambda}} d\xi' + \int_{-\frac{\Lambda}{2}-x_l}^{\frac{\Lambda}{2}} g(\xi') e^{-\frac{i2\pi p \xi'}{\Lambda}} d\xi' =$$

$$\int_{-\frac{\Lambda}{2}}^{\frac{\Lambda}{2}} g(\xi') e^{-\frac{i2\pi p \xi'}{\Lambda}} d\xi'.$$

When Equations (7) and (10) are substituted to Equation (8), the below is satisfied.

$$c'_p = e^{\frac{i2\pi p x_l}{\Lambda}} c_p$$

Therefore, from Equation (7), the coefficient $U'_{o,p}$ of the p-th order diffraction component when the meta-grating MG has the displacement by d satisfies the below.

$$U'_{o,p} = e^{\frac{i2\pi p x_l}{\Lambda}} U_{o,p}$$

When p=1, terms by $$e^{\frac{i2\pi x_l}{\Lambda}}$$

are added as shown below.

$$\varphi_l = 2\pi \times \frac{x_l}{\Lambda}$$

Here, the first-order diffraction light, has a phase change $\varphi_l$ proportional to $x_l/\Lambda$. Thus, Equation (4) is verified.

Figure 3A:
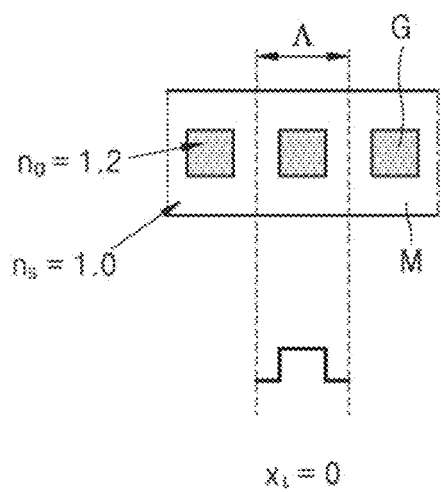
FIGS. 3A, 3B, and 3C are diagrams showing a simulation environment for explaining a change in the geometric phase of first-order diffraction light due to a displacement of the meta-grating.
Figure 3B:
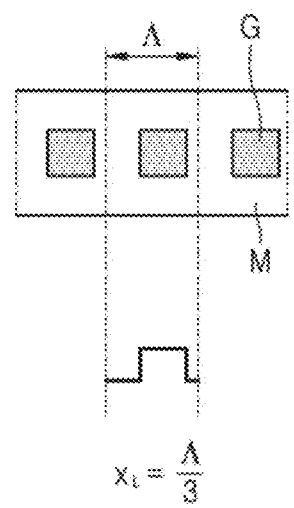
Figure 3C:
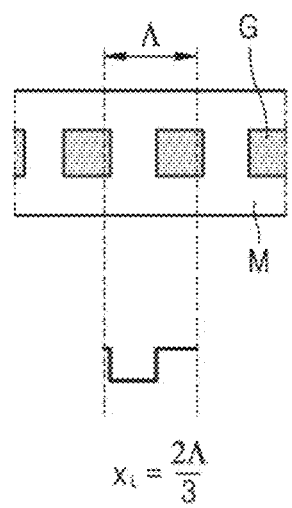

FIGS. 3A to 3C are diagrams showing a simulation environment for explaining a change in the geometric phase of first-order diffraction light due to a displacement of the meta-grating MG. A refractive index of a medium M is 1.0. The refractive index of a grating G is 1.2 and a dielectric constant is 1.44. The grating G is a square grating having a width of 500 nm and a height of 1000 nm, and has a period of 1000 nm. A light wave having two polarizations of transverse magnetic (TM) and transverse electric (TE) is simulated. An incidence angle of the light wave with respect to a vector perpendicular to the grating G is 65 degrees. The wavelength is simulated on the total of 6 cases from 1200 nm to 1700 nm at 100 nm intervals. FIGS. 3A to 3C show cases where displacements are 0, $\Lambda/3$, and $2\Lambda/3$, respectively.

Figure 4:
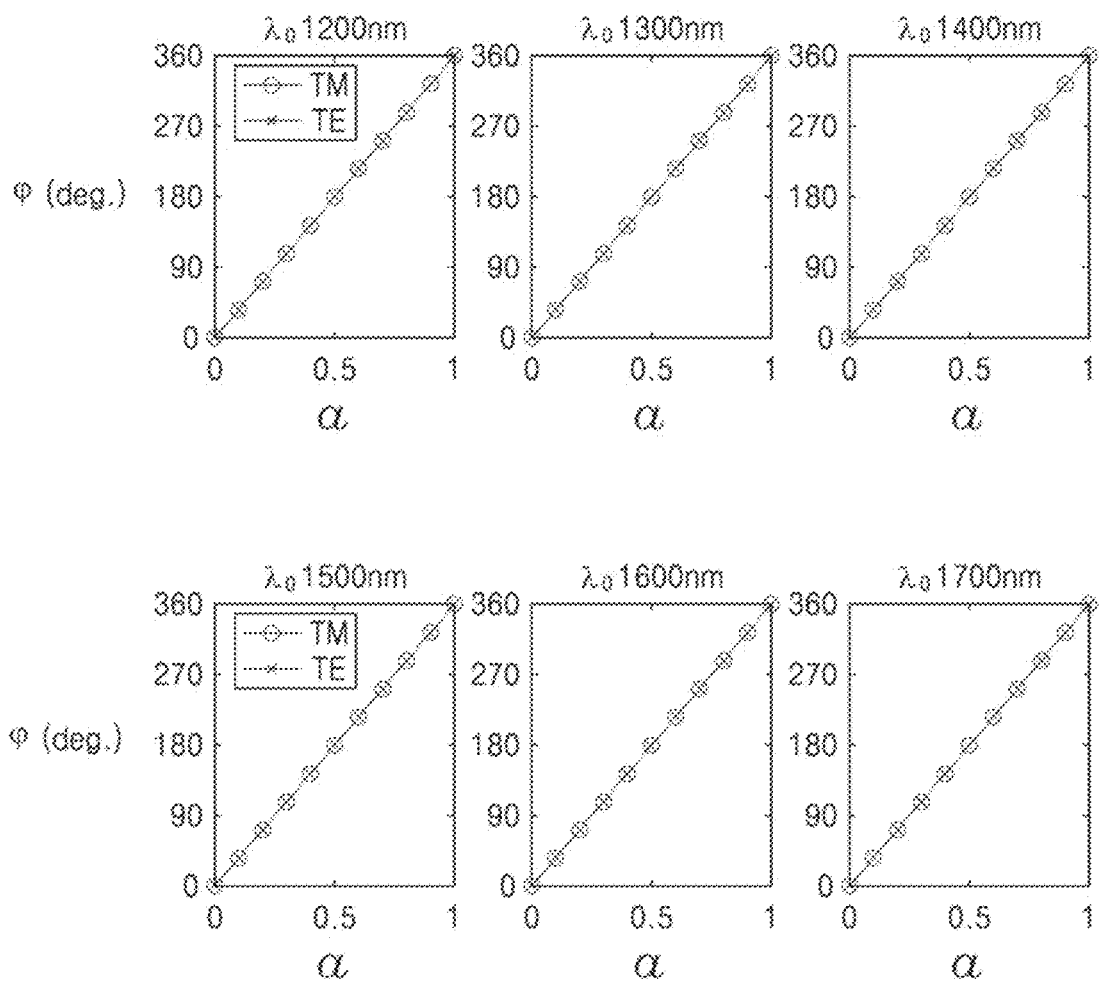
FIG. 4 is a graph showing a simulation result by a simulation environment of FIGS. 3A, 3B, and 3C, and shows a change in the geometric phase of first-order diffraction light according to a ratio of the displacement to the period.

FIG. 4 is a graph showing a simulation result by a simulation environment of FIGS. 3A to 3C, and shows a change in a geometric phase φ of first-order diffraction light according to a ratio of the displacement to the period $\Lambda$. In FIG. 4, a of the horizontal axis is the ratio of the displacement to the period $\Lambda$. That is, $x_l = a\Lambda$. The vertical axis is the geometric phase φ of the first-order diffraction light. Referring to FIG. 4, it may be seen that the phase of the first-order diffraction light changes in proportion to the displacement in a wide wavelength band.

In a phase arrangement, the range of the phase that may be expressed in each pixel MP needs to be wide, and the amplitude needs to be uniform while changing the phase. This is because if the amplitude changes as the phase is adjusted, a generated light wave may have an unwanted side lobe in addition to a main lobe, and thus the SNR may be decreased.

Figure 5:
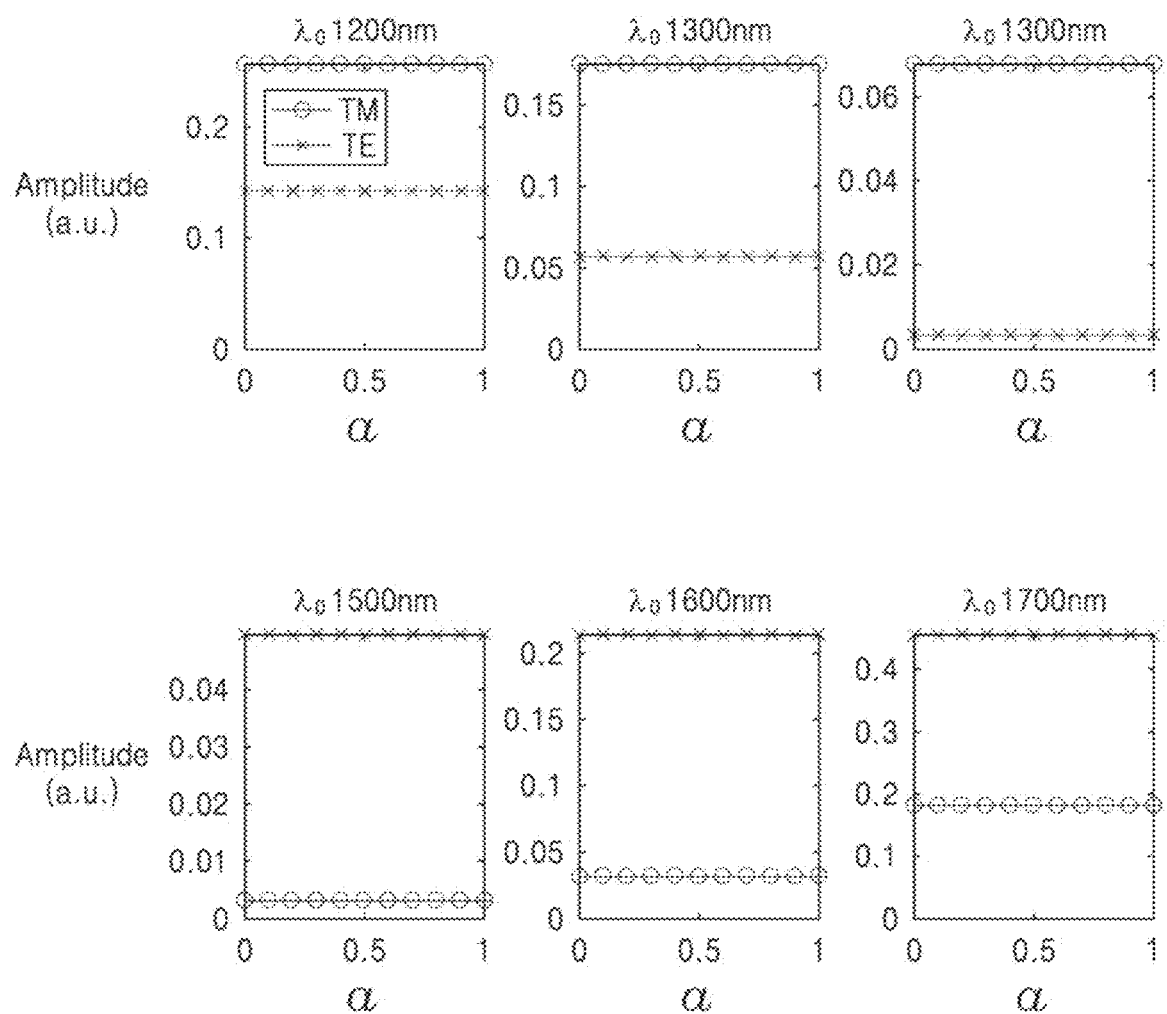
FIG. 5 is a graph showing a simulation result by a simulation environment of FIGS. 3A, 3B, and 3C, and shows a change in the amplitude of first-order diffraction light according to a ratio of the displacement to the period.

FIG. 5 is a graph showing a simulation result by a simulation environment of FIGS. 3A to 3C, and shows a change in the amplitude of first-order diffraction light according to a ratio of the displacement to the period $\Lambda$. In FIG. 5, a of the horizontal axis is the ratio of the displacement to the period $\Lambda$. That is, $x_l = a\Lambda$. The vertical axis is the amplitude of the first-order diffraction light. FIG. 5 show that the amplitude of the first-order diffraction light is constant even if the displacement changes in a wide wavelength band. When steering the first-order diffraction light, a side lobe may be reduced, and thus an improved SNR may be obtained.

As described above, when a periodic and discrete driving signal is applied to the plurality of nano-antennas NA such that the optical intensity, that is, the intensity of transmission/reflection/scattering, periodically changes, the optical intensity of the plurality of nano-antennas NA has the same effect as having a periodic structure, such as the meta-grating MG or effective grating. When the positions of ridges and grooves of the meta-grating MG are moved, an effective displacement occurs. The first-order diffraction light has a geometric phase corresponding to $2\pi$ times a value obtained by dividing the effective displacement by the period $\Lambda$ of the meta-grating MG. Accordingly, as the effective displacement of the meta-grating MG is adjusted, the phase of the pixel MP having the meta-grating MG changes. Because the amplitude is maintained constant while changing the geometric phase of the first-order diffraction light, the optical modulating device 1 capable of phase-only-modulation may be implemented.

Figure 6:
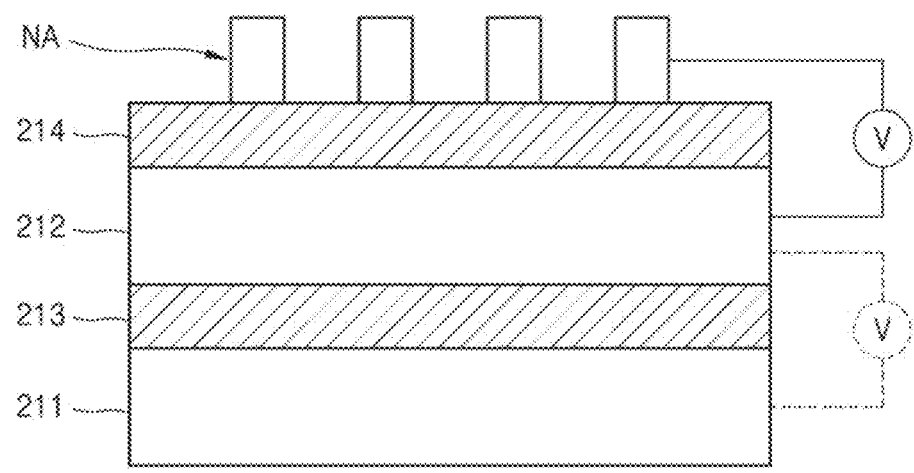
FIG. 6 is a cross-sectional view showing an optical modulating element according to an example embodiment.

The optical modulating element 20 may have various structures. FIG. 6 is a cross-sectional view showing an example embodiment of the optical modulating element 20. Referring to FIG. 6, the optical modulating element 20 may include a reflector 211 and an active layer 212 disposed between the reflector 211 and the plurality of nano-antennas NA and of which optical properties change according to a driving signal. An insulating layer may be disposed between the reflector 211 and the active layer 212 and/or between the active layer 212 and the plurality of nano-antennas NA. The optical modulating element 20 according to the example embodiment shown in FIG. 6 may include a first insulating layer 213 disposed between the reflector 211 and the active layer 212, and a second insulating layer 214 disposed between the active layer 212 and the plurality of nano-antennas NA.

The reflector 211 may be a back reflector electrode disposed below the active layer 212. For example, the reflector 211 may reflect light and simultaneously perform the function of an electrode. The reflector 211 may be optically coupled to the nano-antenna NA, and may reflect light by an optical interaction between the nano-antenna NA and the reflector 211. The reflector 211 may include a predetermined conductor such as metal. For example, the reflector 211 may include at least one metal selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), osmium (Os), iridium (Ir), silver (Ag), gold (Au), etc. and may include an alloy including at least one of these metals. The reflector 211 may include a thin film in which metal nanoparticles such as Ag and Au are dispersed, a carbon nanostructure such as graphene or carbon nanotube (CNT), a conductive polymer such as poly(3,4-ethylenedioxythiophene) (PEDOT), polypyrrole (PPy), poly(3-hexylthiophene) (P3HT), etc., or may include a conductive oxide, etc.

The nano-antenna NA may convert incidence light including both visible and invisible electromagnetic waves of a specific wavelength or frequency into the form of localized surface plasmon resonance and capture the energy of the light and may be referred to as a nano-structured antenna for light. The nano-antenna NA may be a conductive pattern (e.g., a metal pattern). The conductive pattern may be in contact with a non-conductive layer (e.g., a dielectric layer). Plasmon resonance may occur on the interface between the conductive pattern and the non-conductive layer (e.g., the dielectric layer). In this regard, the non-conductive layer (e.g., the dielectric layer) may be the second insulating layer 214, or may be a layer separate from the second insulating layer 214. In the following description, the conductive pattern itself is regarded as a nano-antenna N10. Similar to the interface between the conductive pattern and the non-conductive layer (e.g., the dielectric layer), an interface where surface plasmon resonance occurs may be collectively referred to as a "meta surface" or a "meta structure".

Figure 7:
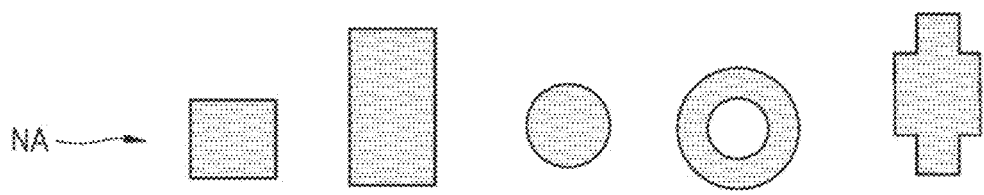
FIG. 7 is a diagram showing examples of a planar shape of a nano-antenna according to an example embodiment.

FIG. 7 is a diagram showing examples of a planar shape of the nano-antenna NA. As illustrated in FIG. 7, the nano-antenna NA may have various planar shapes such as square, rectangular, circular, donut-shaped, and cross-shaped. The nano-antenna NA may have a dimension of a sub-wavelength. Here, the sub-wavelength may be a dimension smaller than the operating wavelength of the nano-antenna NA. Any one dimension forming the shape of the nano-antenna NA, for example, at least one of the thickness, width, length, or interval between the nano-antennas NA may have the dimension of the sub-wavelength. The resonance wavelength may vary depending on the shape or dimension of the nano-antenna NA.

The nano-antenna NA may include a metal material having high conductivity by which surface plasmon excitation may occur. For example, the nano-antenna NA may include at least one metal selected from the group consisting of Cu, Al, Ni, Fe, Co, Zn, Ti, Ru, Rh, Pd, Pt, Os, Ir, Ag, Au, etc., and may include an alloy including at least one of these metals. The nano-antenna NA may include a thin film in which metal nanoparticles such as Ag and Au are dispersed, a carbon nanostructure such as graphene or CNT, a conductive polymer such as (PEDOT), polypyrrole (PPy), poly(3-hexylthiophene) (P3HT), etc., or may include a conductive oxide, etc. The nano-antenna NA and the reflector 211 may include different metals. The nano-antenna NA may be a dielectric antenna.

The active layer 212 may be a layer of which physical properties change according to its electrical conditions. The permittivity or refractive index of the active layer 212 may change according to electrical conditions related to the active layer 212 and its surrounding region. A change in the dielectric constant of the active layer 212 may be due to a change in the charge concentration (charge density) of the region(s) in the active layer 212. For example, the permittivity of the active layer 212 may change by the charge concentration (charge density) of the region(s) in the active layer 212. The permittivity of the active layer 212 may change according to an electric field or voltage applied to the active layer 212. The active layer 212 may include, for example, a semiconductor, an oxide, a nitride, or a liquid crystal. The active layer 212 may include a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), and gallium indium zinc oxide (GIZO). The active layer 212 may include a transition metal nitride (TMN) such as titanium nitride (TiN), zirconium nitride (ZrN), hafnium nitride (HfN), and tantalum nitride (TaN), a phase change material, graphene, a transition metal dichalcogenide, or a 2D material. In addition, the active layer 212 may include an electro-optic (EO) material of which effective permittivity changes when an electrical signal is applied. The EO material may include, for example, a crystalline material such as lithium niobium trioxide ($LiNbO_3$), lithium tantalum oxide ($LiTaO_3$), potassium tantalate niobate (KTN), or lead zirconate titanate (PZT), or may include various polymers having EO properties.

The first insulating layer 213 and the second insulating layer 214 may include an insulating material (a dielectric material). At least one of the first and second insulating layers 213 and 214 may include at least one of an insulating silicon compound and an insulating metal compound. The insulating silicon compound may include, for example, silicon oxide (SiOx), silicon nitride (SixNy), silicon oxynitride (SiON), etc., and the insulating metal compound may include, for example, aluminum oxide ($Al_2O_3$), hafnium oxide (HfO), zirconium oxide (ZrO), hafnium silicon oxide (HfSiO), etc. The first insulating layer 213 and the second insulating layer 214 may include the same material or may have different material configurations.

The active layer 212 may be electrically insulated from the reflector 211 by the first insulating layer 213, and the active layer 212 may be electrically insulated from the nano-antenna NA by the second insulating layer 214. According to a voltage (a driving signal) applied between the reflector 211 and the active layer 212, the charge concentration in a first boundary region of the active layer 212 with the first insulating layer 213 may change. In addition, according to a voltage (a driving signal) applied between the active layer 212 and the nano-antenna NA, the charge concentration in a second boundary region of the active layer 212 with the second insulating layer 214 may change.

Each of the first boundary region and the second boundary region may be divided into a plurality of unit regions corresponding to the plurality of nano-antennas NA, and may be a charge accumulation region or a charge depletion region according to the voltage. When the voltage applied to the nano-antenna NA is higher than the voltage applied to the active layer 212, the charge accumulation region may be formed in an upper portion of the active layer 212. When the voltage applied to the nano-antenna NA is lower than the voltage applied to the active layer 212, the charge depletion region may be formed in the upper portion of the active layer 212. When the voltage applied to the reflector 211 is higher than the voltage applied to the active layer 212, the charge accumulation region may be formed in a lower portion of the active layer 212. When the voltage applied to the reflector 211 is lower than the voltage applied to the active layer 212, the charge depletion region may be formed in the lower portion of the active layer 212. As the charge accumulation region and/or the charge depletion region are formed in the active layer 212, the reflection characteristic of the optical modulating element 20 may be controlled. Accordingly, the above-described meta-grating MG may be formed, and the direction of the first-order diffraction light may be controlled by appropriately arranging the geometric phases of the plurality of pixels MP to steer a beam.

According to an example embodiment, the optical modulating element 20 may be implemented by the plurality of nano-antennas NA having a Fabry-Perot resonance structure. FIGS. 8A to 8E are diagrams showing various example embodiments of the nano-antenna NA having the Fabry-Perot resonance structure. Referring to FIGS. 8A to 8E, the nano-antenna NA may include a first reflection structure 221, a cavity layer 222 provided on the first reflection structure 221, and a second reflection structure 223 provided on the cavity layer 222.

Figure 8:
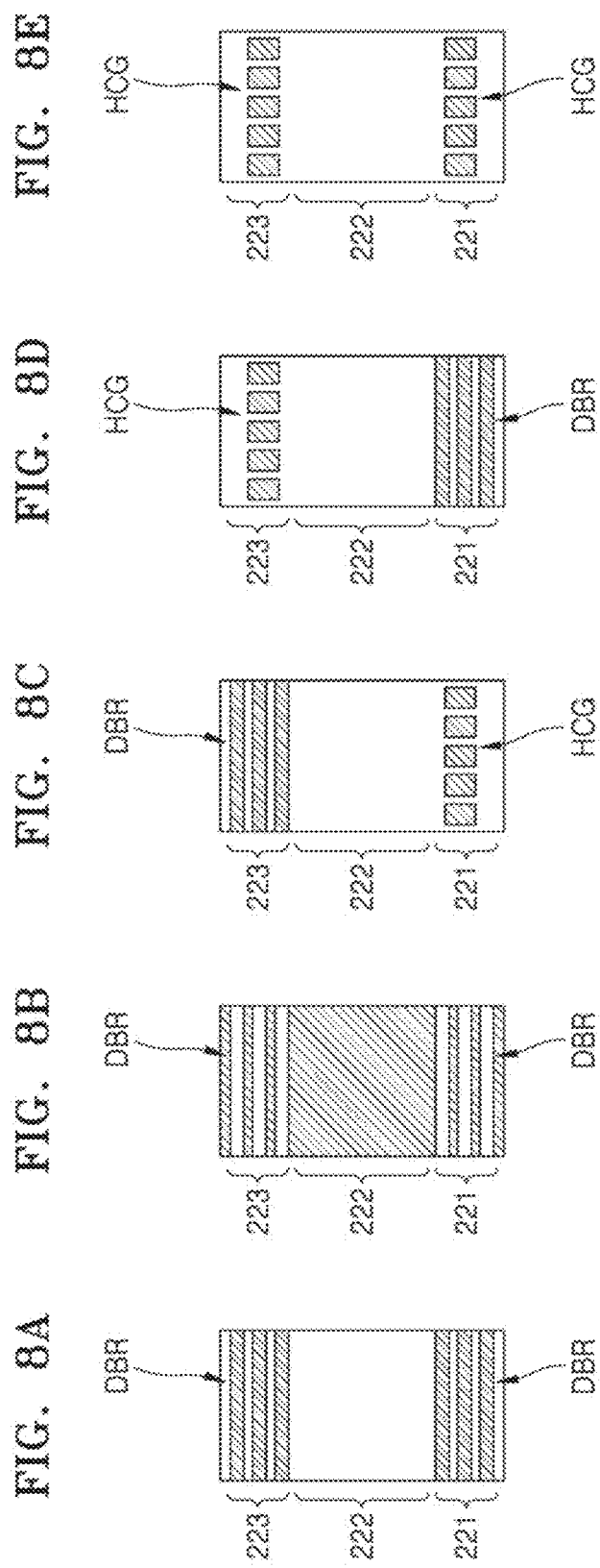
FIGS. 8A, 8B, 8C, 8D, and 8E are diagrams showing various nano-antenna having the Fabry-Perot resonance structure according to example embodiments.

As an example, as shown in FIGS. 8A and 8B, both the first reflective structure 221 and the second reflective structure 223 may be distributed Bragg reflectors (DBRs) in which materials having different refractive indices are alternately stacked. As an example, as shown in FIG. 8C, the first reflection structure 221 may be the DBR, and the second reflection structure 223 may be a high contrast grating (HCG) in which a column, a disk, a grating structure, etc. with a high refractive index are surrounded by a medium with a low refractive index. As an example, as shown in FIG. 8D, the first reflective structure 221 may be the HCG, and the second reflective structure 223 may be the DBR. As an example, as shown in FIG. 8E, both the first reflective structure 221 and the second reflective structure 223 may be HCGs.

One of the first reflective structure 221, the cavity layer 222, and the second reflective structure 223 may be an active layer of which optical properties such as a refractive index and a dielectric constant are changed by a driving signal. The driving signal may be, for example, a voltage signal, and may be a heating signal that applies heat to a corresponding component. For example, the cavity layer 222 may be an active layer. In this case, the cavity layer 222 may include the same material as the above-described active layer 212 in FIG. 6. At least one of layers constituting the first reflective structure 221 or the second reflective structure 223 may be an active layer of which optical properties are changed by the driving signal. For example, at least one layer of the first reflective structure 221 may be an EO material layer including an EO material of which effective permittivity changes when an electrical signal is applied. Accordingly, when power is applied from an external power source, the refractive index of the EO material layer of the first reflective structure 221 changes, and the phase of light resonating between the first reflective structure 221 and the second reflective structure 223 changes.

According to the structure/shape of the nano-antenna NA and the arrangement method thereof, a resonance wavelength, a resonance wavelength width, a resonance polarization characteristic, a resonance angle, reflection/transmission/scattering characteristics, etc. may vary. Accordingly, the optical modulating element 20 having characteristics suitable for the purpose may be manufactured by controlling the structure/shape and arrangement method of the nano-antenna NA. An apparatus for steering a beam in a predetermined direction may be implemented by using the optical modulating element 20 according to example embodiments.

Figure 9:
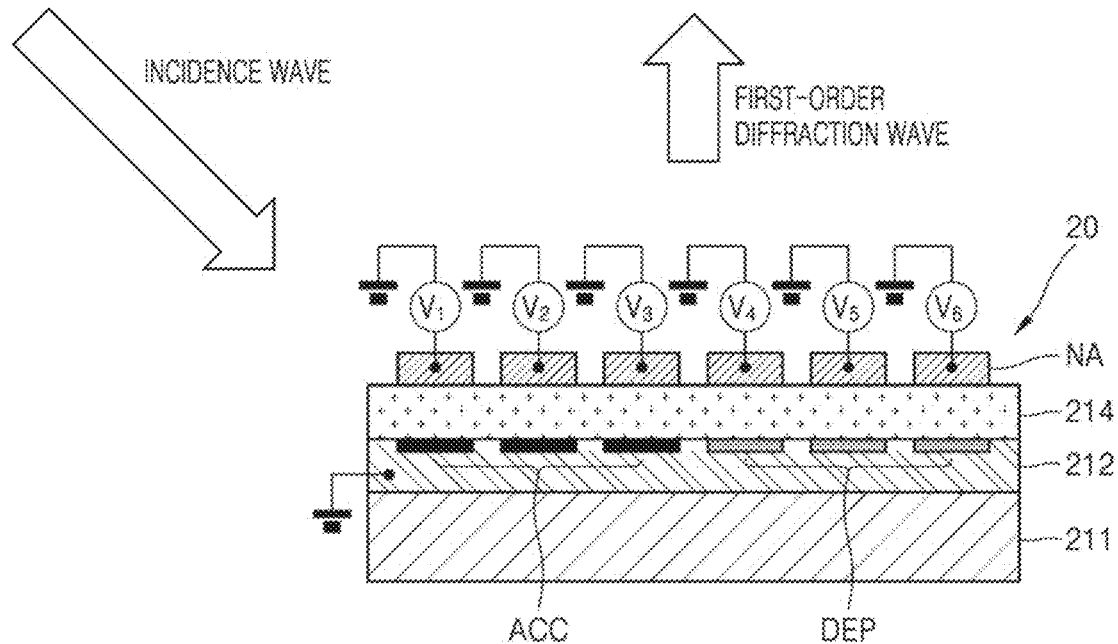
FIG. 9 is a configuration diagram showing an optical modulating element according to an example embodiment.

FIG. 9 is a configuration diagram showing an example embodiment of the optical modulating element 20. The optical modulating element 20 shown in FIG. 9 has a structure shown in FIG. 6, the lower reflector 211 includes Au, the active layer 212 includes ITO, the first insulating layer 214 includes oxide, and the nano-antenna NA includes Au. The thickness of the active layer 212 may be 10 nm, and the thickness of the lower reflector 211 may be semi-infinite. A driving signal is applied between the active layer 212 and the nano-antenna NA. The active layer 212 is a common electrode, and an individual driving signal is applied to the nano-antenna NA.

One pixel MP has one antenna group AG, and one antenna group AG has six nano-antennas NA. That is, M=1 and N=6. The nano-antenna NA has a period of 400 nm, a width of 200 nm, and a thickness of 20 nm. The period of the antenna group AG is 400 nm×6=2400 nm. The pixel MP has a period of 2400 nm.

Figure 10:
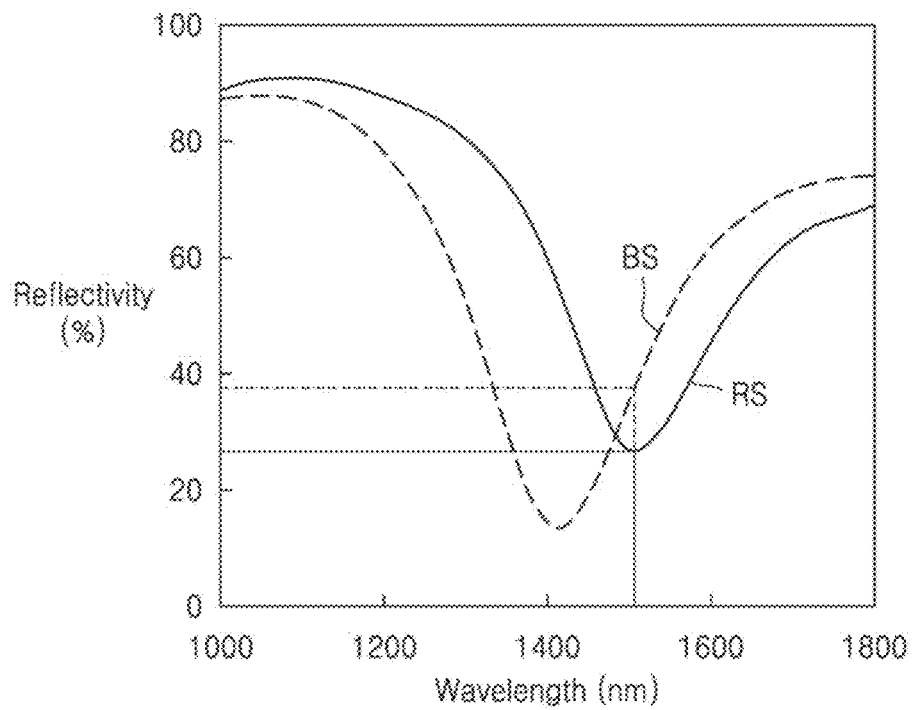
FIG. 10 is a diagram showing a result of simulating a reflectance spectrum of a nano-antenna of the optical modulating element shown in FIG. 9 according to an example embodiment.

FIG. 10 is a diagram showing a result of simulating a reflectance spectrum of the nano-antenna NA according to an example embodiment of the optical modulating element 20 shown in FIG. 9. When 0 V is applied to the active layer 212 and a positive voltage Va is applied to the nano-antenna NA, the concentration of free electrons increases in a boundary region between the active layer 212 and the second insulating layer 214, resulting in a charge accumulation state ACC in FIG. 9. As a result, reflectance is blue-shifted as indicated by BS in FIG. 10. To the contrary, when a negative voltage $V_d$ is applied to the nano-antenna NA, the concentration of free electrons decreases in the boundary region between the active layer 212 and the second insulating layer 214, resulting in a charge depletion state DEP in FIG. 9. As a result, the reflectance is red-shifted as indicated by RS in FIG. 10. In FIG. 10, when a light source having a wavelength of 1500 nm is incident on the optical modulating element 20 at an angle of 40 degrees, the reflectance of the nano-antenna NA is 38% in the charge accumulation state and is 22% in the charge depletion state. That is, a contrast of 16% p(percent point), which is a difference in the reflectance, may be obtained.

Figure 11:
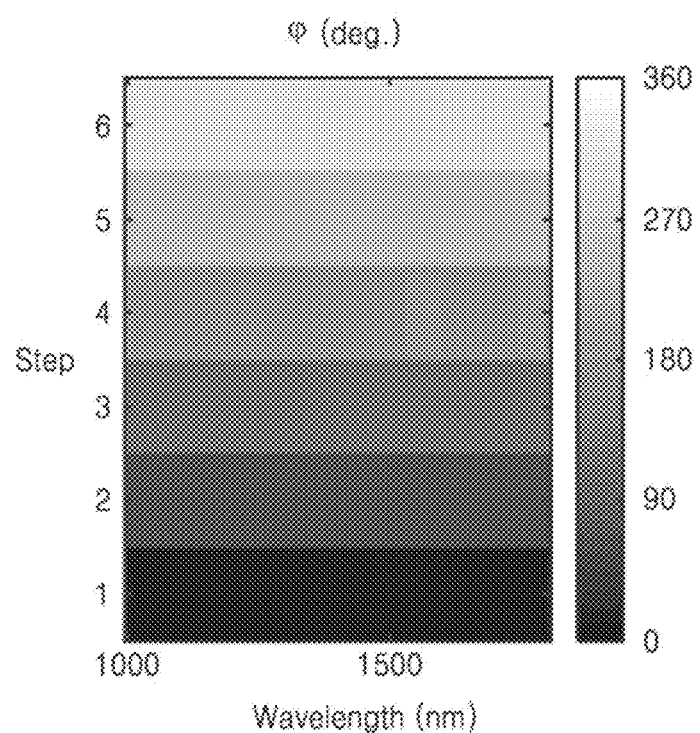
FIG. 11 is a diagram showing a result of simulating a phase for each wavelength based on a discrete displacement of a meta-grating of the optical modulating element shown in FIG. 9 according to an example embodiment.

FIG. 11 is a diagram showing a result of simulating the phase φ for each wavelength based on a discrete displacement of the meta-grating MG according to an example embodiment of the optical modulating element 20 shown in FIG. 9. The graph of FIG. 11 shows the geometric phase φ of first-order diffraction light when the displacement of an effective grating discretely increases as (d=2, 3, 4, 5, 6) with respect to driving signals $(V_1, V_2, V_3, V_4, V_5, V_6)=(V_a, V_a, V_a, V_d, V_d, V_d)$ applied to six nano-antennas NA in case where d=1. The driving signals applied to the six nano-antennas NA discretely change as shown below. $V_a$ denotes a voltage forming a charge accumulation region, and $V_d$ denotes a voltage forming a charge depletion region.

d=1, $(V_1, V_2, V_3, V_4, V_5, V_6)=(V_a, V_a, V_a, V_d, V_d, V_d)$
d=2, $(V_1, V_2, V_3, V_4, V_5, V_6)=(V_d, V_a, V_a, V_a, V_d, V_d)$
d=3, $(V_1, V_2, V_3, V_4, V_5, V_6)=(V_d, V_d, V_a, V_a, V_a, V_d)$
d=4, $(V_1, V_2, V_3, V_4, V_5, V_6)=(V_d, V_d, V_d, V_a, V_a, V_a)$
d=5, $(V_1, V_2, V_3, V_4, V_5, V_6)=(V_a, V_d, V_d, V_d, V_a, V_a)$
d=6, $(V_1, V_2, V_3, V_4, V_5, V_6)=(V_a, V_a, V_d, V_d, V_d, V_a)$

Referring to FIG. 11, the geometric phase φ has values of 0 degrees, 60 degrees, 120 degrees, 180 degrees, 240 degrees, and 360 degrees according to the displacement. The values of the geometric phase φ commonly appears in a wavelength of 1000 nm to 180 nm.

Figure 12:
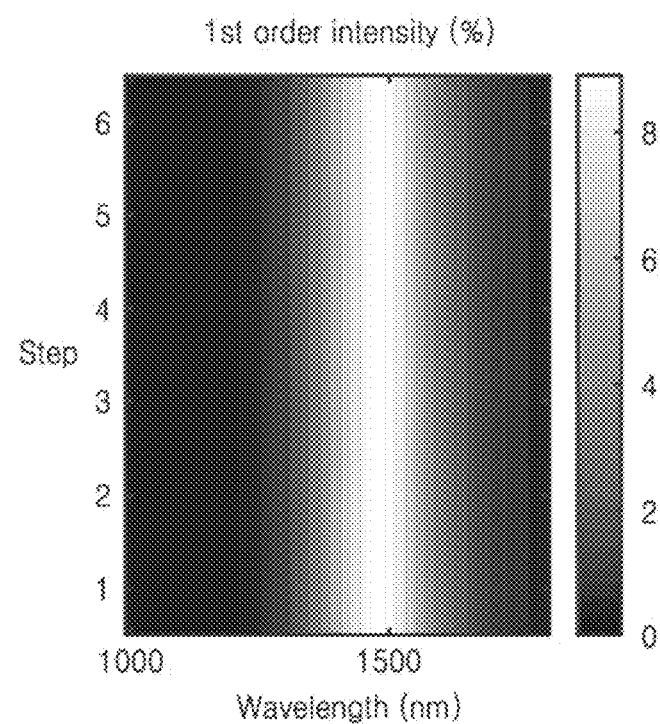
FIG. 12 is a diagram showing a result of simulating the intensity of first-order diffraction light with respect to incidence light based on the discrete displacement of a meta-grating of the optical modulating element shown in FIG. 9 according to an example embodiment.

FIG. 12 is a diagram showing a result of simulating the intensity of first-order diffraction light with respect to incidence light based on the discrete displacement of the meta-grating MG according to an example embodiment of the optical modulating element 20 shown in FIG. 9. FIG. 12 shows a ratio (%) of the intensity of the first-order diffraction light to the intensity of the incidence light for each wavelength as the displacement of the meta-grating MG discretely increases. FIG. 12 shows efficiency of about 5% at about 1500 nm. There is an advantage that the efficiency does not change when the displacement changes for a fixed wavelength. An efficiency value may vary depending on the wavelength because contrast in the reflectance of the nano-antenna NA constituting the meta-grating MG is the same as the contrast shown in FIG. 10.

Figure 13:
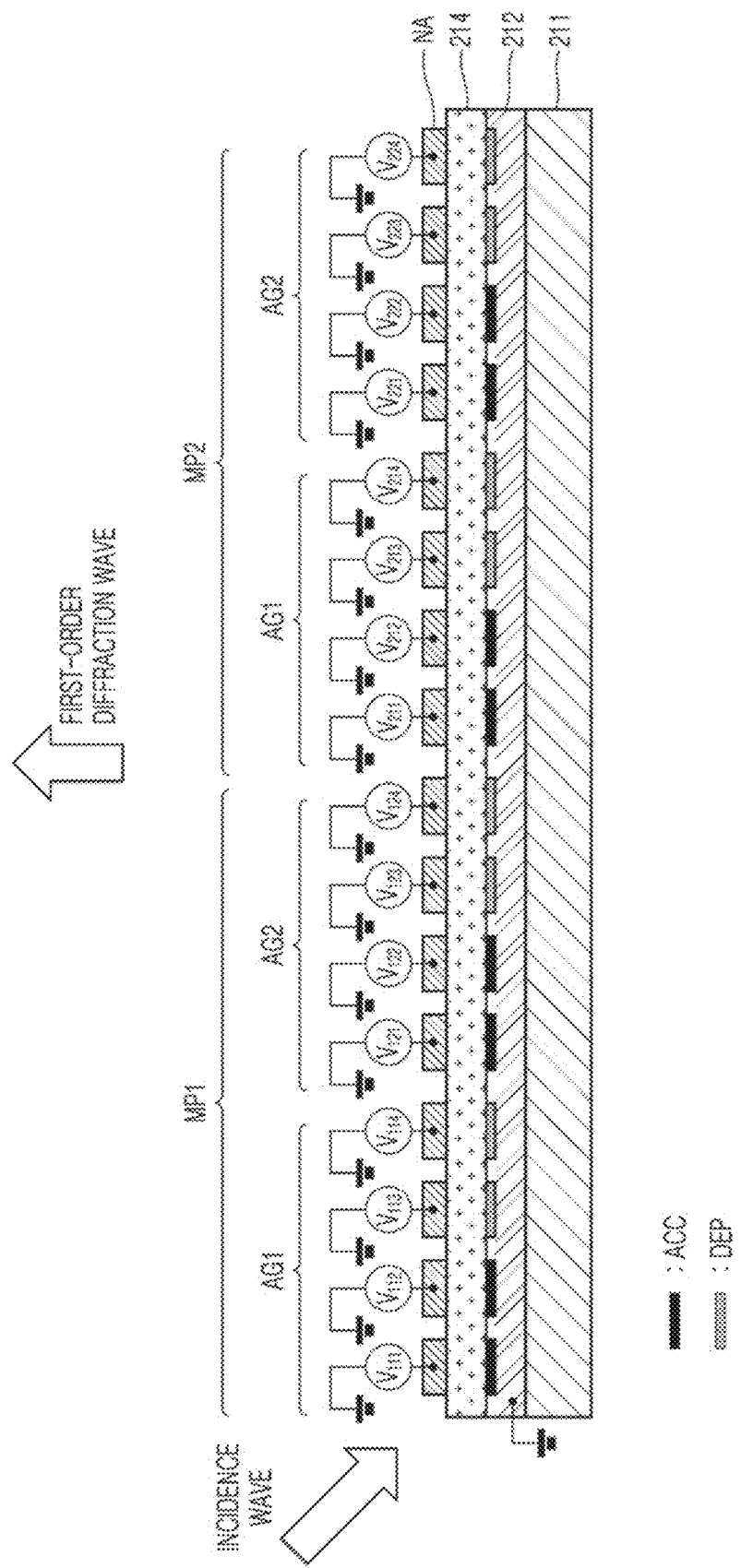
Figure 14:
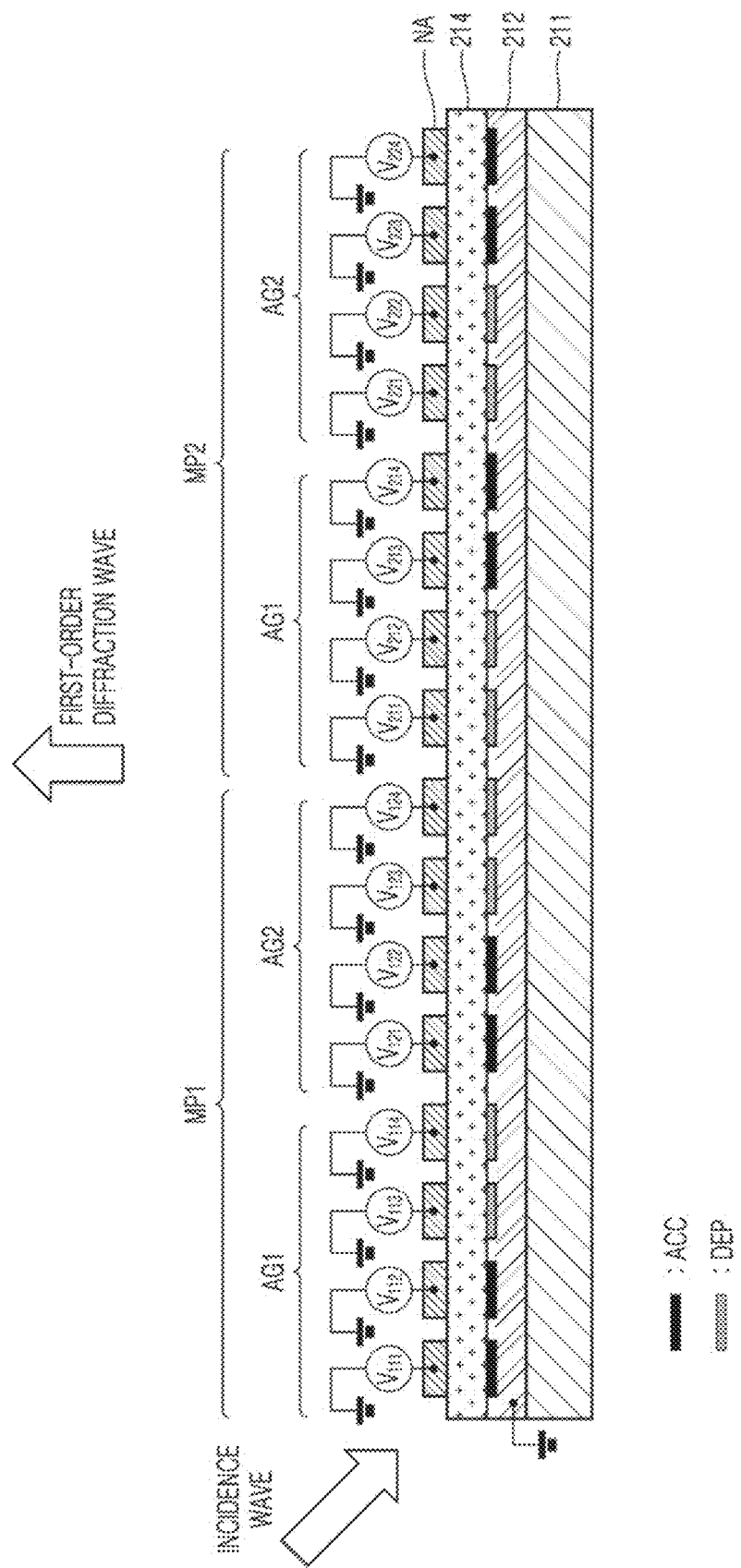

FIGS. 13 and 14 are schematic diagrams showing an example embodiment of the optical modulating element 20. FIG. 13 shows an example where there is no relative phase difference between the plurality of pixels MP. FIG. 14 shows an example where a beam is steered by a relative phase difference between the plurality of pixels MP. The optical modulating element 20 shown in FIGS. 13 and 14 has a structure shown in FIG. 6, the lower reflector 211 includes Au, the active layer 212 includes ITO, the first insulating layer 214 includes oxide, and the nano-antenna NA includes Au. The active layer 212 has a thickness of 5 nm and a doping concentration of $5\times10^{20}/cm^3$. The second insulating layer 214 has a thickness of 10 nm and a refractive index of 2.0. The thickness of the lower reflector 211 is semi-infinite. A driving signal is applied between the active layer 212 and the nano-antenna NA. The active layer 212 is a common electrode, and an individual driving signal is applied to the nano-antenna NA. The two pixels MP1 and MP2 are arranged one-dimensionally. Two pixels MP1 and MP2 respectively have two antenna groups AG1 and AG2, and each of the antenna groups AG1 and AG2 has four nano-antennas NA. That is, L=2, M=2, N=4. The nano-antenna NA has a length of 210 nm, a thickness of 50 nm, and a period of 330 nm. The period Λ of the antenna group AG is 330 nm×4=1320 nm. The period of the pixel MP is 1320 nm×2=2640 nm.

In the case of FIG. 13, a driving signal $V_{lmn}$ applied to an arbitrary nano-antenna $A_{lmn}$ has a relationship that satisfies the following conditional equation below.

$$V_{lmn} = \begin{cases} V_a & \text{if } n \leq 2 \\ V_d & \text{otherwise} \end{cases}$$

That is, driving signal patterns of the pixels MP1 and MP2 are the same and are as follows.

$(V_{111}, V_{112}, V_{113}, V_{114}) = (V_a, V_a, V_d, V_d)$
$(V_{121}, V_{122}, V_{123}, V_{124}) = (V_a, V_a, V_d, V_d)$
$(V_{211}, V_{212}, V_{213}, V_{214}) = (V_a, V_a, V_d, V_d)$
$(V_{221}, V_{222}, V_{223}, V_{224}) = (V_a, V_a, V_d, V_d)$

Therefore, the geometric phase according to the displacement of the meta-grating MG is the same in the pixels MP1 and MP2. An emission angle of first-order diffraction light may be calculated by the equation shown below.

$$\theta_{out} = \sin^{-1}\left(\sin\theta_{in} - \frac{\lambda_0}{\Lambda}\right)$$

Figure 15:
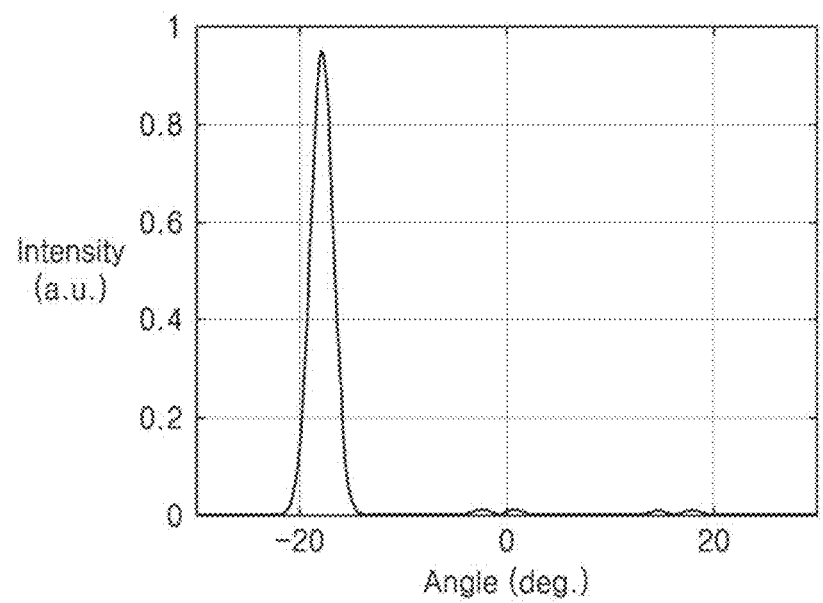
FIG. 15 is a diagram showing first-order diffraction light formed according to an example embodiment of the optical modulating element shown in FIG. 13.

Here, Λ denotes the period of the driving signal pattern, that is, the period of the antenna group AG, and is 1320 nm. When incidence light of a wavelength of 1550 nm and TM polarization is incident on the optical modulating element 20 at an incidence angle of 60 degrees, the emission angle of the first-order diffraction light is −17.8 degrees. FIG. 15 is a diagram showing first-order diffraction light formed according to an example embodiment of the optical modulating element 20 shown in FIG. 13. As shown in FIG. 15, it may be seen that the first-order diffraction light having a very small side lobe is formed at an emission angle of about −17.8 degrees.

In the case of FIG. 14, the pixels MP1 and MP2 have a geometric phase difference of 180 degrees. For this driving, the driving signal $V_{lmn}$ applied to the arbitrary nano-antenna $A_{lmn}$ has a relationship that satisfies the following conditional equation shown below.

$$V_{lmn} = \begin{cases} V_a & \text{if } (2l + n + 1) \bmod 4 \leq 1 \\ V_d & \text{otherwise} \end{cases}$$

That is, the driving signal patterns of the pixels MP1 and MP2 are as follows.

$(V_{111}, V_{112}, V_{113}, V_{114}) = (V_a, V_a, V_d, V_d)$
$(V_{121}, V_{122}, V_{123}, V_{124}) = (V_a, V_a, V_d, V_d)$
$(V_{211}, V_{212}, V_{213}, V_{214}) = (V_d, V_d, V_a, V_a)$
$(V_{221}, V_{222}, V_{223}, V_{224}) = (V_d, V_d, V_a, V_a)$

Accordingly, the geometric phase of the pixel MP1 is 0 degrees, and the geometric phase of the pixel MP2 is 180 degrees. As a result, the two pixels MP1 and MP2 having 0 degrees and 180 degrees respectively form a super-pixel. A period $\Lambda_{sp}$ of the super pixel is twice the period of each of the pixels MP1 and MP2, and the two antenna groups AG1 and AG2 are included in each of the pixels MP1 and MP2, and thus the period $\Lambda_{sp}$ of the super pixel is 4 times the period Λ of the antenna groups AG1 and AG2. An emission angle of first-order diffraction light may be calculated by the equation shown below.

$$\theta_{out} = \sin^{-1}\left(\sin\theta_{in} - \frac{\lambda_0}{\Lambda} + \frac{\lambda_0}{\Lambda_{SP}}\right).$$

Figure 16:
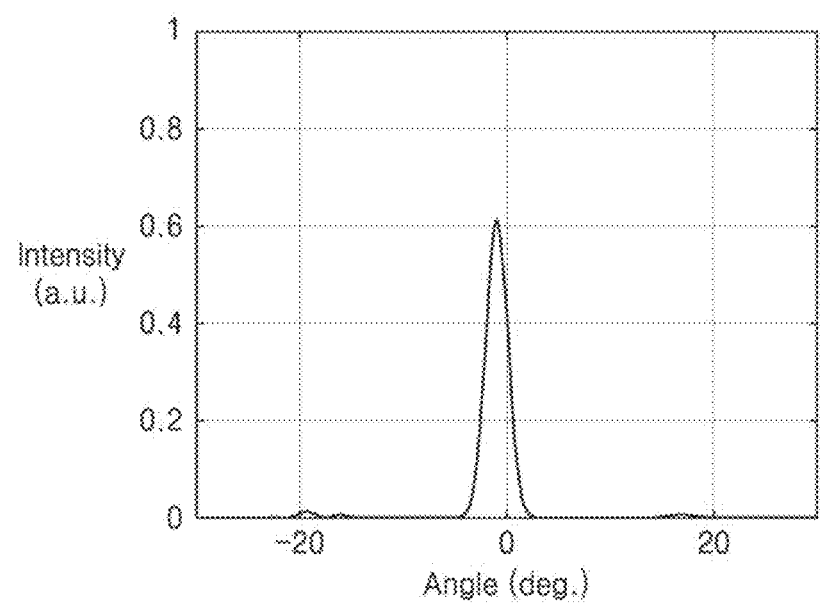
FIG. 16 is a diagram showing first-order diffraction light formed according to an example embodiment of the optical modulating element shown in FIG. 14.

When the period of the antenna group AG is 1320 nm, and incidence light of a wavelength of 1550 nm and TM polarization is incident on the optical modulating element 20 at an incidence angle of 60 degrees, the emission angle of the first-order diffraction light is −0.84 degrees. FIG. 16 is a diagram showing first-order diffraction light formed according to an example embodiment of the optical modulating element 20 shown in FIG. 14. As shown in FIG. 16, it may be seen that first-order diffraction light having a very small side lobe is formed at an emission angle of about −0.84 degrees.

Figure 17A:
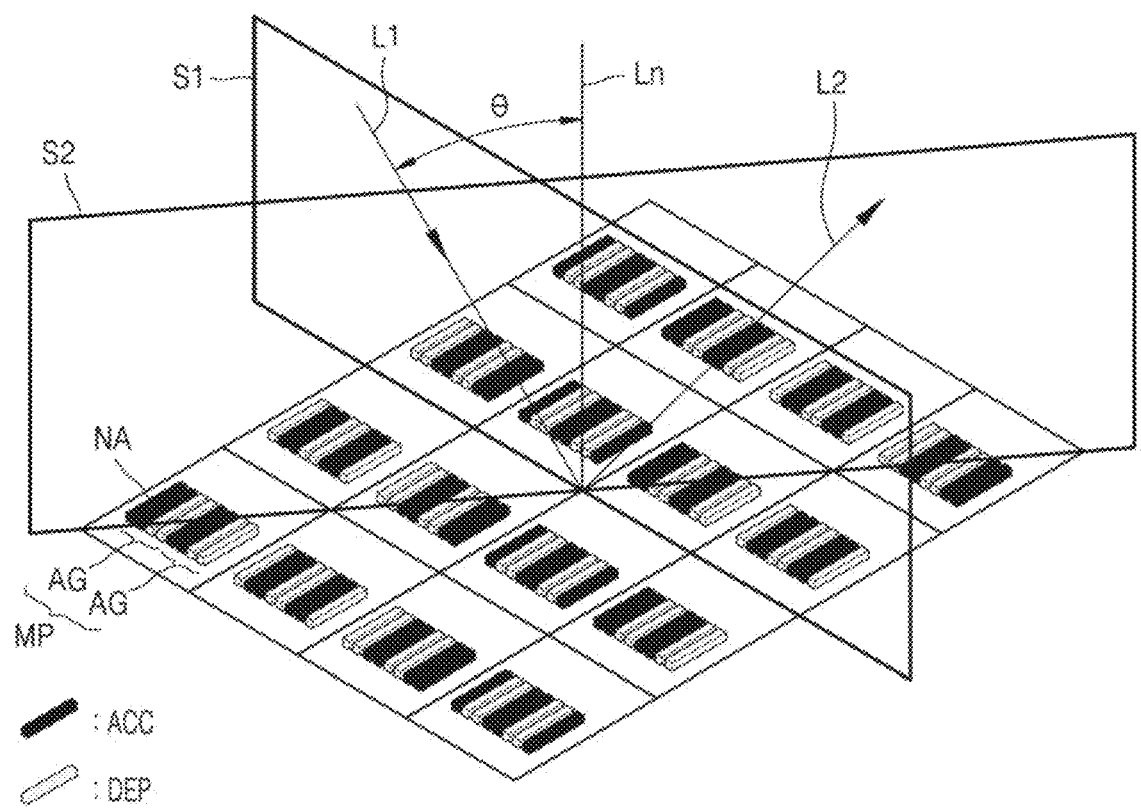

The plurality of pixels MP may be two-dimensionally arranged. FIGS. 17A and 17B are diagrams showing an example of a structure in which the plurality of pixels MP are two-dimensionally arranged in a Cartesian coordinate. FIG. 17A shows a 2D arrangement of the plurality of pixels MP. FIG. 17B shows the phase φ of the meta-grating MG corresponding to each of the plurality of pixels MP.

Referring to FIGS. 17A and 17B, each pixel MP includes two antenna groups AG, and each antenna group AG includes four nano-antennas NA. When a periodic and discrete driving signal is applied to the plurality of nano-antennas NA of each pixel MP, an effective grating is formed in each pixel MP. In FIG. 17A, the nano-antenna NA indicated by a dark pattern has a strong optical intensity, and the nano-antenna NA indicated by a bright pattern has a weak optical intensity.

The incidence light L1 may be incident on the plurality of pixels MP at the incidence angle of θ with respect to a normal line Ln within a incidence plane S1 perpendicular to the plurality of pixels MP. When the meta-gratings MG of all the pixels MP have the same phase, the first-order diffraction light is emitted in the direction of the normal line Ln. When there is a phase gradient between the neighboring pixels MP, 2D beam steering is possible. Accordingly, when the phases of the meta-grating MG of the plurality of pixels MP are properly arranged, the 2D steered first-order diffraction light L2 that is emitted along an emission plane S2 having an angle with respect to the incidence plane S1 may be obtained.

In the example embodiment, driving signals are applied such that the meta-gratings MG of the four pixels MP in each row have geometric phase differences of 0 degrees, 90 degrees, 180 degrees, and 360 degrees, respectively, and that the meta-gratings MG of the four pixels MP in each column have geometric phase differences of 0 degrees, 90 degrees, 180 degrees, and 360 degrees, respectively. For example, the driving signal is applied such that each pixel MP has a phase difference of 90 degrees from the neighboring pixel MP. Thus, 2D beam steering is possible.

FIGS. 17A and 17B show the plurality of pixels MP having a 2D arrangement structure in the Cartesian coordinate but the plurality of pixels MP may be arranged in various coordinates such as a polar coordinate, a hexagonal coordinate, etc.

The pattern of the driving signal may have various duty ratios. As a result, an effective grating having various duty ratios may be formed. In the embodiment of the optical modulating element 20 shown in FIG. 9, the duty ratio of the meta-grating MG is 50%. Various duty ratios may be implemented by generalizing Equation (11) as shown below.

$$R_{lmn}(d) = \begin{cases} 1, & (n-d) \bmod N < C \\ 0, & \text{otherwise} \end{cases} \qquad \text{Equation (11)}$$

Figure 18A:
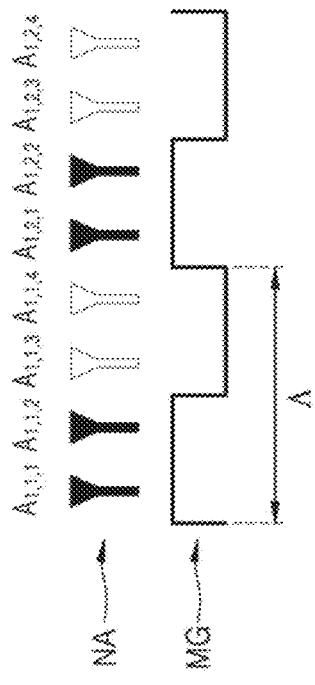
FIGS. 18A to 18C are diagrams showing examples of various duty ratios of a meta-grating.
Figure 18B:
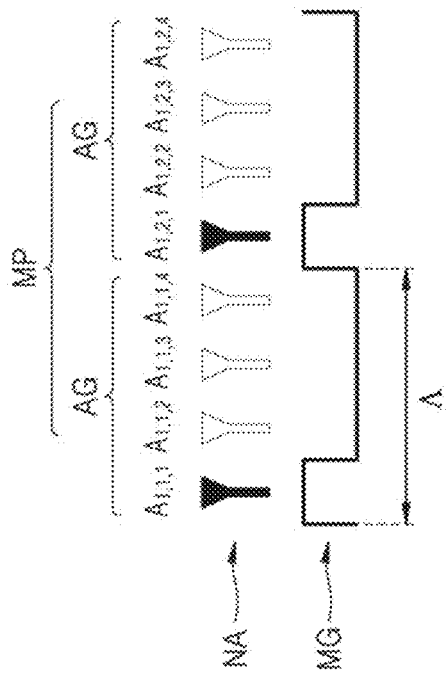
Figure 18C:
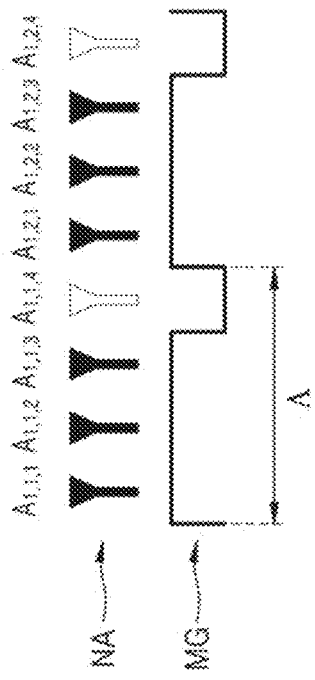

Here, C denotes a criterion which is N/2 in Equation (11). The generalized C may have a value of 1 to N−1. FIGS. 18A to 18C are diagrams showing examples of various duty ratios of the meta-grating MG. FIGS. 18A to 18C show distributions of various C values when M=2, N=4, and d=1. N=4, and thus C may have a value from 1 to 3. In FIG. 18A, when C=1, the duty ratio of the meta-grating MG is 25%. In FIG. 18B, when C=2, the duty ratio of the meta-grating MG is 50%. In FIG. 18C, when C=1, the duty ratio of the meta-grating MG is 75%. The duty ratio may be appropriately determined in order to increase the ratio of light emitted in a desired direction and decrease the ratio of light emitted in an undesired direction.

According to the example embodiments of the optical modulating device 1 described above, the effective grating or the meta-grating MG is formed by individually adjusting the optical intensity of the nano-antenna NA, that is, the intensity of transmission/reflection/scattering, and a high-order diffraction component of the incidence light wave has the geometric phase proportional to a displacement by causing the displacement in the optical intensity distribution of the nano-antenna NA inside the pixel MP. The optical modulating device 1 described above may more easily adjust the displacement of the meta-grating MG by digitizing and changing the optical intensity distribution of the nano-antenna NA. Therefore, a beam may be steered at various desired angles by using the digitalized control method. Further, the amplitude of emission light is maintained constant within a steering range by steering the first-order diffraction light. Therefore, excellent steering light with a small ratio of the side lobe may be obtained. In addition, a wiring structure for applying a driving signal to the plurality of nano-antennas NA may be simple and a linear voltage-phase response characteristic may be obtained. In addition, the optical modulating device 1 operates in an all-solid-state where no mechanical movement exists, and thus a high-speed operation is possible, and the dispersion of response due to errors in the manufacturing process is small, and thus a uniform response characteristic may be obtained.

Figure 19:
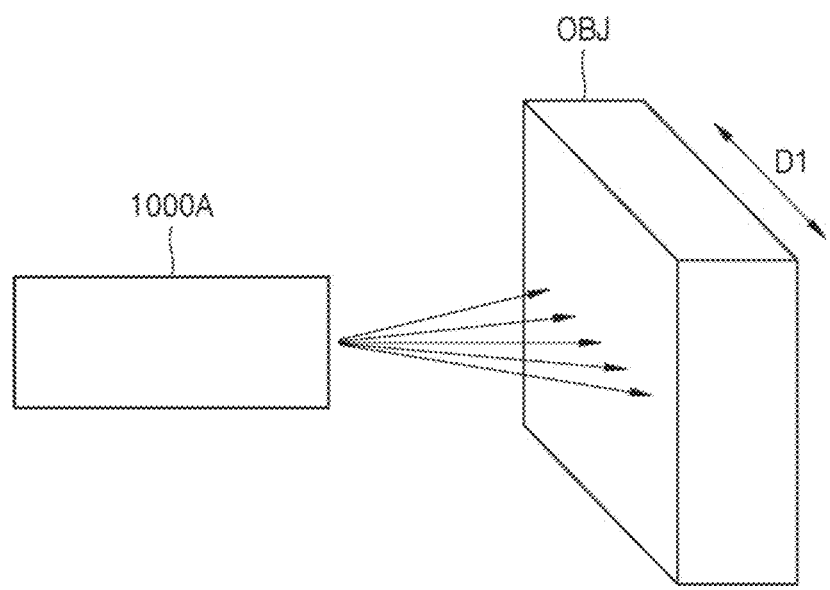
FIG. 19 is a conceptual diagram illustrating a beam steering device as an example of an optical modulating device according to an example embodiment.

FIG. 19 is a conceptual diagram illustrating a beam steering device 1000A as an example of the optical modulating device 1 according to an example embodiment. Referring to FIG. 19, a beam may be steered in a 1D direction by using the beam steering device 1000A. For example, the beam may be steered toward a predetermined object OBJ in a first direction D1. The beam steering device 1000A may employ the optical modulating element 20 including the plurality of pixels MP that are one-dimensionally arranged.

Figure 20:
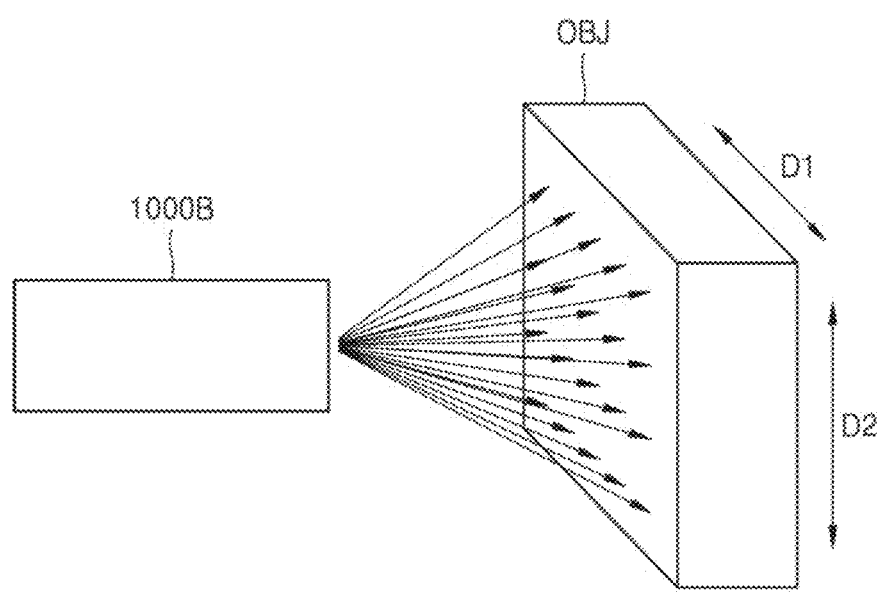
FIG. 20 is a conceptual diagram illustrating a beam steering device as an example of an optical modulating device according to an example embodiment.

FIG. 20 is a conceptual diagram illustrating a beam steering device 1000B as an example of the optical modulating device 1 according to an example embodiment. Referring to FIG. 20, a beam may be steered in a 2D direction by using the beam steering device 1000B. For example, the beam may be steered toward the predetermined object OBJ in the first direction D1 and a second direction D2 perpendicular to the first direction D1. The beam steering device 1000B may employ the optical modulating element 20 including the plurality of pixels MP that are two-dimensionally arranged. The beam steering devices 1000A and 1000B described with reference to FIGS. 19 and 20 may be non-mechanical ultrafast beam scanning apparatuses.

Figure 21:
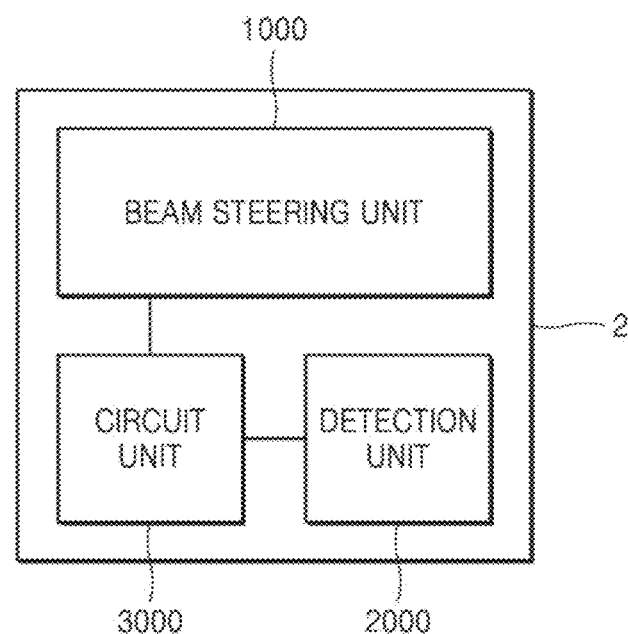
FIG. 21 is a block diagram of an example of an optical apparatus employing the optical modulating device according to an example embodiment.

FIG. 21 is a block diagram of an example of an optical apparatus 2 employing the optical modulating device 1 according to an example embodiment. Referring to FIG. 21, the optical apparatus 2 may include a beam steering unit 1000. The beam steering unit 1000 may include the optical modulating device 1 described according to example embodiments. The optical apparatus 2 may include a detection unit 2000 for detecting light that is steered by the beam steering unit 1000 and reflected by an object. The detection unit 2000 may include a plurality of light detection elements, and may further include other optical members. In addition, the optical apparatus 2 may further include a circuit unit 3000 connected to at least one of the beam steering unit 1000 and the detection unit 2000. The circuit unit 3000 may include an operation unit that obtains and calculates data, and may further include a driving unit and a control unit. In addition, the circuit unit 3000 may further include a power supply unit and a memory. The beam steering unit 1000 of the example embodiment employing the optical modulating device 1 steers first-order diffraction light having a reduced side lobe, and thus the SNR of the detection unit 2000 may be improved. In addition, the beam steering unit 1000 has no mechanical movement for beam steering, and thus a high-speed operation is possible and a dispersion of response is small. Therefore, precise high-speed detection of light is possible.

In FIG. 21, the optical apparatus 2 includes the beam steering unit 1000 and the detection unit 2000 in one device, but the beam steering unit 1000 and the detection unit 2000 may not be provided as a single device and may be separately provided in separate devices. In addition, the circuit unit 3000 is not connected to the beam steering unit 1000 or the detection unit 2000 by wire, but may be connected through wireless communication. In addition, the configuration of FIG. 21 may be variously modified.

The optical modulating device 1 according to the example embodiment described above may be applied to various optical apparatuses. For example, the optical modulating device 1 may be applied to a light detection and ranging (LiDAR) device. The LiDAR device may be a phase-shift device or a time-of-flight (TOF) device. The LiDAR device may be applied to autonomous vehicles, flying objects such as drones, mobile devices, small walking means (e.g., bicycles, motorcycles, strollers, boards, etc.), robots, human/animal assistance means (e.g., cane, helmet, jewelry, clothing, watches, bags, etc.), Internet of Things (IoT) devices/systems, security devices/systems, etc.

Figure 22:
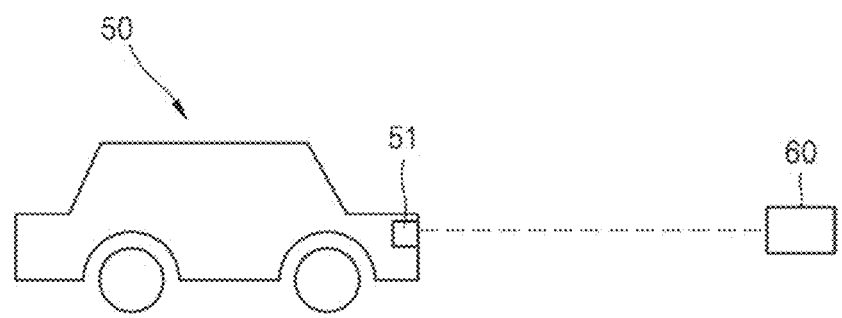
Figure 23:
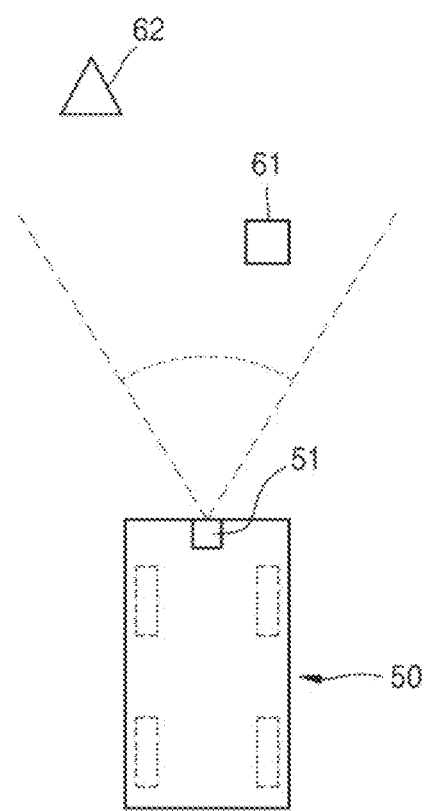

FIGS. 22 and 23 are conceptual diagrams illustrating a case where a LiDAR device 51 including the optical modulating device 1 according to an example embodiment is applied to a vehicle 50. FIG. 22 is a side view of the vehicle 50, and FIG. 23 is a plan view of the vehicle 50. Referring to FIG. 22, the LiDAR device 51 may be applied to the vehicle 50, and may be used to obtain information about an object 60. The vehicle 50 may have an autonomous driving function. The LiDAR device 51 may be used to detect an object or person, that is, the object 60, in the direction in which the vehicle 50 travels. Further, a distance to the object 60 may be measured using information such as a time difference between a transmission signal and a detection signal. In addition, as shown in FIG. 23, the information about a nearby object 61 and a distant object 62 within the scan range may be obtained.

The optical modulating device according to various example embodiments may be applied to various optical apparatuses other than the LiDAR device. For example, when the optical modulating device according to various example embodiments is used, three-dimensional (3D) information of a space and an object may be obtained through scanning, and thus the optical modulating device may be applied to a 3D image obtaining device or a 3D camera. In addition, the optical modulating device may be applied to a holographic display device and a structured light generating device. In addition, the optical modulating device may be applied to various optical apparatuses such as various beam scanning devices, hologram generating devices, optical coupling devices, variable focus lenses, depth sensors, etc. In addition, the optical modulating device may be applied to various fields in which a "meta surface" or a "meta structure" is used. In addition, the optical modulating device and the optical apparatus including the same according to the example embodiment may be applied to various optical and electronic device fields for various purposes.

According to the above-described example embodiments of the optical modulating device, an optical modulating device capable of reducing a side lobe may be implemented. In addition, an optical modulating device capable of high-speed operation and a small dispersion of response may be implemented.

According to the above-described example embodiments of the optical modulating device, first-order diffraction light is steered, and thus improved steering light with a small ratio of the side lobe may be obtained. In addition, the optical modulating device operates in an all-solid-state where no mechanical movement exists, and thus a high-speed operation is possible, and the dispersion of response due to errors in the manufacturing process is small, and thus a uniform response characteristic may be obtained.

While the optical modulating device and the optical apparatus including the same have been described with reference to example embodiments illustrated in the figures, the example embodiments described herein have been presented by way of example only, and it will be appreciated by those skilled in the art that various changes and other equivalent embodiments may be made from the above description. Therefore, the disclosed example embodiments should be considered not in a limited sense but in a descriptive sense. The scope is not limited to the example embodiment described and illustrated above but is defined by the appended claims, and all differences which ranges in the equivalent scope of the claims.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. An optical modulating device comprising:
an incidence optical system;
an optical modulating assembly comprising a plurality of nano-antennas that form a meta-grating based on a driving signal, the optical modulating assembly being configured to change a traveling direction of incidence light that is incident at an incidence angle from the incidence optical system based on an effective displacement of the meta-grating according to the driving signal;
an emission optical system configured to emit light steered by the optical modulating assembly; and
a plurality of pixels,
wherein the emission optical system is further configured to emit first-order diffraction light of the incidence light based on the meta-grating,
wherein each pixel of the plurality of pixels comprises two or more antenna groups,
wherein the two or more antenna groups respectively comprise the plurality of nano-antennas, and
wherein the driving signal of a same pattern is applied to the two or more antenna groups included in a pixel among the plurality of pixels, a period of the pattern being same as a period of each antenna group of the two or more antenna groups.

2. The optical modulating device of claim 1, wherein a central axis of the emission optical system is parallel to an optical axis of the first-order diffraction light when a displacement of the meta-grating is 0.

3. The optical modulating device of claim 1, wherein a central axis of the emission optical system coincides with an optical axis of the first-order diffraction light when a displacement of the meta-grating is 0.

4. The optical modulating device of claim 1, wherein the incidence angle of the incidence light with respect to a surface normal vector of the optical modulating assembly is $\theta_{in}$, and an angle of a central axis of the emission optical system is $\theta_{out}$, a wavelength of the incidence light is $\lambda_0$, and a period of the meta-grating is $\Lambda$, satisfies:

$$\sin\theta_{out} = \sin\theta_{in} \pm \frac{\lambda_0}{\Lambda}.$$

5. The optical modulating device of claim 1, wherein the plurality of pixels respectively comprise the plurality of nano-antennas.

6. The optical modulating device of claim 5, wherein a period of the meta-grating is equal to the period of the two or more antenna groups.

7. The optical modulating device of claim 6, wherein, a number of the plurality of pixels is L, a number of antenna groups in each pixel of the plurality of pixels is M, and a number of nano-antennas in each antenna group of the two or more antenna groups is N,
an n-th nano-antenna of an m-th antenna group of an l-th pixel MP is $A_{lmn}$ and
an optical intensity of $A_{lmn}$ is $R_{lmn}$, satisfies:

$$R_{lmn}(d) = \begin{cases} 1, & (n-d) \bmod N < C \\ 0, & \text{otherwise.} \end{cases},$$

where d=1, 2, ..., N, and C is any one of 1 to N−1.

8. The optical modulating device of claim 5, wherein the plurality of pixels are provided one-dimensionally.

9. The optical modulating device of claim 5, wherein the plurality of pixels are provided two-dimensionally.

10. The optical modulating device of claim 1, wherein the optical modulating assembly further comprises:
a reflector; and
an active layer provided between the reflector and the plurality of nano-antennas, and
wherein optical properties of the active layer changes based on the driving signal.

11. The optical modulating device of claim 10, wherein the plurality of nano-antennas include metal antennas.

12. The optical modulating device of claim 10, wherein the plurality of nano-antennas include dielectric antennas.

13. The optical modulating device of claim 1, wherein each nano-antennas of the plurality of nano-antennas has a Fabry-Perot resonance structure that comprises a first reflection structure, a cavity layer provided on the first reflection structure, and a second reflection structure provided on the cavity layer.

14. An optical modulating device comprising:
an incidence optical system;
an optical modulating assembly comprising a plurality of pixels each comprising a plurality of nano-antennas, the optical modulating assembly being configured to change a traveling direction of incidence light that is incident at a fixed incidence angle from the incidence optical system by changing an optical intensity of the plurality of nano-antennas based on a periodic and discrete driving signal that is applied to the plurality of nano-antennas;
an emission optical system configured to emit light steered by the optical modulating assembly,
wherein, an incidence angle of the incidence light with respect to a surface normal vector of the optical modulating assembly is $\theta_{in}$, an angle of a central axis of the emission optical system is $\theta_{out}$, a wavelength of the incidence light is $\lambda_0$, and a period of a meta-grating is $\Lambda$, satisfies:

$$\sin\theta_{out} = \sin\theta_{in} \pm \frac{\lambda_0}{\Lambda},$$

wherein each pixel of the plurality of pixels comprises two or more antenna groups,
wherein the two or more antenna groups respectively comprise the plurality of nano-antennas, and
wherein the driving signal of a same pattern is applied to the two or more antenna groups included in a pixel among the plurality of pixels, a period of the pattern being same as a period of each antenna group of the two or more antenna groups.

15. The optical modulating device of claim 14, wherein a period of the driving signal is equal to the period of the two or more antenna groups.

16. The optical modulating device of claim 15, wherein a number of the plurality of pixels is L, a number of antenna groups in each of the plurality of pixels is M, and a number of nano-antennas in each of the two or more antenna groups is N,
an n-th nano-antenna of an m-th antenna group of an l-th pixel MP is $A_{lmn}$, and
an optical intensity of $A_{lmn}$ is $R_{lmn}$, satisfies:

$$R_{lmn}(d) = \begin{cases} 1, & (n-d)\bmod N < C \\ 0, & \text{otherwise} \end{cases},$$

where d=1, 2, . . . , N, and C is any one of 1 to N−1.

17. An optical apparatus comprising:
an optical modulating device comprising:
an incidence optical system;
an optical modulating assembly comprising a plurality of nano-antennas that form a meta-grating based on a driving signal, the optical modulating assembly being configured to change a traveling direction of incidence light that is incident at an incidence angle from the incidence optical system based on an effective displacement of the meta-grating according to the driving signal;
an emission optical system configured to emit light steered by the optical modulating assembly; and
a plurality of pixels,
wherein the emission optical system is further configured to emit first-order diffraction light of the incidence light based on the meta-grating,
wherein each pixel of the plurality of pixels comprises two or more antenna groups,
wherein the two or more antenna groups respectively comprise the plurality of nano-antennas, and
wherein the driving signal of a same pattern is applied to the two or more antenna groups included in a pixel among the plurality of pixels, a period of the pattern being same as a period of each antenna group of the two or more antenna groups.

18. The optical apparatus of claim 17, further comprising at least one of a light detection and ranging (LiDAR) device, a three-dimensional (3D) image obtaining device, a holographic display device, and a structured light generating device.

* * * * *